(12) United States Patent
Mossoba et al.

(10) Patent No.: US 11,334,870 B2
(45) Date of Patent: May 17, 2022

(54) WEARABLE TRANSACTION DEVICE

(71) Applicant: Capital One Services, LLC, McLean, VA (US)

(72) Inventors: Michael Mossoba, Arlington, VA (US); Abdelkadar M'Hamed Benkreira, Washington, DC (US); Joshua Edwards, Philadelphia, PA (US)

(73) Assignee: Capital One Services, LLC, McLean, VA (US)

( * ) Notice: Subject to any disclaimer, the term of this patent is extended or adjusted under 35 U.S.C. 154(b) by 191 days.

(21) Appl. No.: 16/730,702

(22) Filed: Dec. 30, 2019

(65) Prior Publication Data
US 2021/0201293 A1 Jul. 1, 2021

(51) Int. Cl.
*G06Q 20/32* (2012.01)
*G06F 1/16* (2006.01)
*G06Q 40/02* (2012.01)
*G06Q 20/10* (2012.01)
*G06Q 20/40* (2012.01)
*H04W 12/08* (2021.01)

(52) U.S. Cl.
CPC ......... *G06Q 20/3278* (2013.01); *G06F 1/163* (2013.01); *G06Q 20/108* (2013.01); *G06Q 20/3223* (2013.01); *G06Q 20/405* (2013.01); *G06Q 40/02* (2013.01); *H04W 12/08* (2013.01)

(58) Field of Classification Search
CPC ............................................. G06Q 20/3278
USPC ............................................................. 705/42
See application file for complete search history.

(56) References Cited

U.S. PATENT DOCUMENTS

| 2012/0016793 | A1 | 1/2012 | Peters et al. |
| 2016/0253651 | A1* | 9/2016 | Park ...................... G07F 9/023 705/39 |
| 2016/0379205 | A1* | 12/2016 | Margadoudakis ... G06Q 20/327 705/71 |
| 2017/0053286 | A1* | 2/2017 | Bhagat .................. G06Q 20/40 |

OTHER PUBLICATIONS

Wikipedia, "Contactless payment", https://en.wikipedia.org/wiki/Contactless_payment, Dec. 24, 2019, 10 pages.
Wikipedia, "Contactless smart card", https://en.wikipedia.org/wiki/Contactless_smart_card, Dec. 22, 2019, 8 pages.

* cited by examiner

*Primary Examiner* — Cho Kwong
(74) *Attorney, Agent, or Firm* — Harrity & Harrity, LLP

(57) ABSTRACT

A wearable transaction device may include a housing, a fastener component attached to the housing, and an electronic chip secured within the housing. The wearable transaction device may detect a connection with a user device, and receive, from the user device and via the connection, security information for operating the wearable transaction device. The security information may indicate one or more conditions for placing the wearable transaction device in a payment mode or a non-payment mode. The wearable transaction device may receive a request to perform the transaction, and determine, based on the security information, whether the wearable transaction device is in the payment mode or the non-payment mode. The wearable transaction device may selectively perform the transaction based on whether the wearable transaction device is in the payment mode or the non-payment mode.

20 Claims, 13 Drawing Sheets

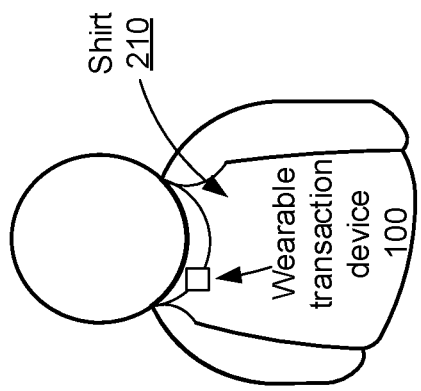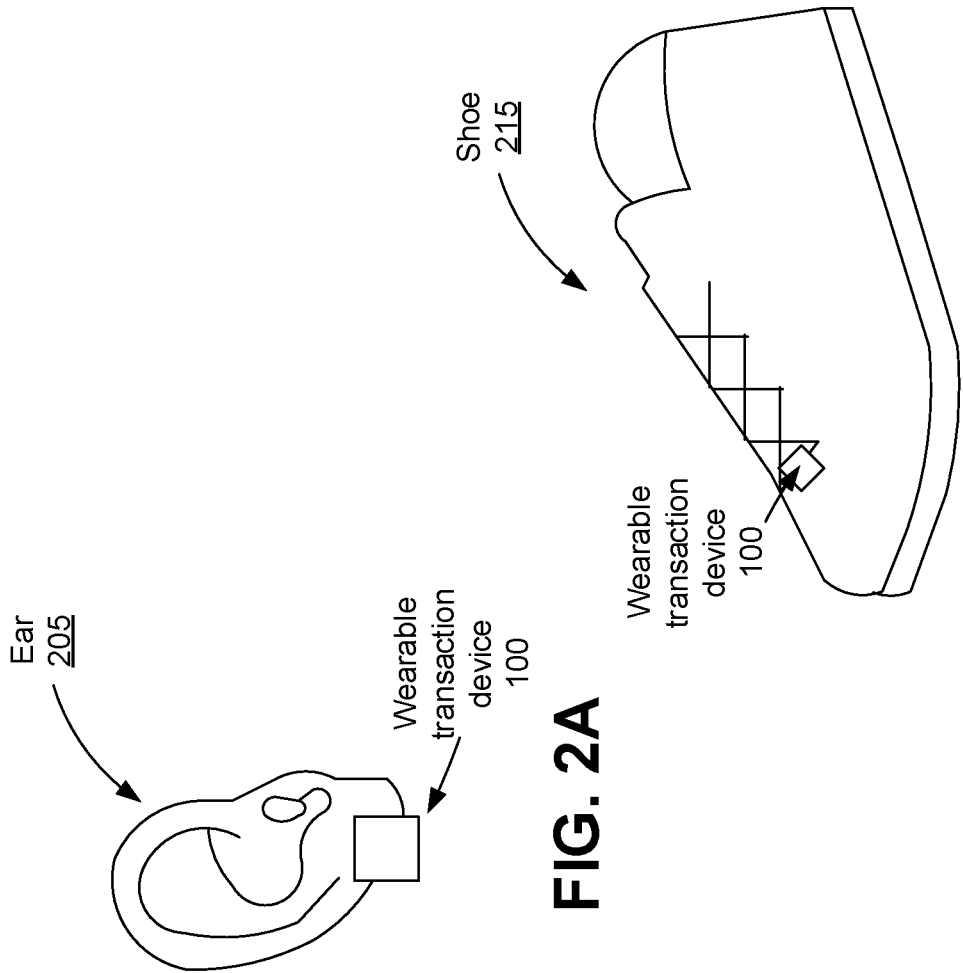

WEARABLE TRANSACTION DEVICE

BACKGROUND

A contactless transaction involves the use of a transaction card (e.g., a credit card, a debit card, a smart transaction card, and/or the like) and/or a device (e.g., a smartphone and/or the like) to pay for products or services at a transaction terminal (e.g., a point of sale (PoS) terminal) without a need for the transaction card and/or the device to contact the transaction terminal (e.g., via a swipe through a card reader or an insertion into a chip reader) to process the transaction. Rather, the contactless transaction utilizes near-field communication (NFC) to allow the transaction card and/or the device to make a payment while spaced away from but in close proximity to the transaction terminal.

SUMMARY

According to some implementations, a wearable transaction device may include a housing having a front surface, a rear surface, and a side surface, the front surface being monolithic with the side surface. The wearable transaction device may include a fastener component attached to the rear surface of the housing, the fastener component being movable between an open position and a closed position to facilitate attaching the wearable transaction device to a user or apparel of the user. The wearable transaction device may include an electronic chip enclosed within an interior of the housing. The electronic chip may detect a connection with a user device and may receive, from the user device and via the connection, security information for operating the wearable transaction device. The security information may indicate one or more conditions for placing the wearable transaction device in a payment mode or a non-payment mode. The payment mode may allow the wearable transaction device to be used to perform a transaction. The non-payment mode may prevent the wearable transaction device from being used to perform any transaction. The electronic chip may receive a request to perform the transaction, and may determine, based on the security information, whether the wearable transaction device is in the payment mode or the non-payment mode. The electronic chip may selectively perform the transaction based on whether the wearable transaction device is in the payment mode or the non-payment mode.

According to some implementations, a wearable transaction device may include a housing defining an interior. The wearable transaction device may include a fastener component attached to the housing, the fastener component being movable between an open position and a closed position to facilitate attaching the wearable transaction device to a user or apparel of the user. The wearable transaction device may include an electronic chip enclosed within the interior of the housing. The electronic chip may detect a connection with a user device, and may receive, from the user device and via the connection, security information for operating the wearable transaction device. The security information may correlate a condition associated with the fastener component to an operating mode of the wearable transaction device. The condition relating to the open position or the closed position of the fastener component. The operating mode may include a payment mode or a non-payment mode. The payment mode may allow the wearable transaction device to be used to perform a transaction. The non-payment mode may prevent the wearable transaction device from being used to perform any transaction. The electronic chip may receive a request for the transaction, and may determine the condition associated with the fastener component. The electronic chip may determine, based on the condition associated with the fastener component and the security information, whether the wearable transaction device is in the payment mode or the non-payment mode. The electronic chip may selectively perform the transaction based on whether the wearable transaction device is in the payment mode or the non-payment mode.

According to some implementations, a wearable transaction device may include a housing having a front surface, a rear surface, and a side surface. The front surface, the rear surface, and the side surface may each have an area less than 40 $cm^2$. The wearable transaction device may include a fastener component projecting from the housing. The fastener component may be adapted to attach the wearable transaction device to a user or apparel of the user. The wearable transaction device may include an electronic chip secured within the housing. The electronic chip may detect a connection with a user device and may receive, from the user device and via the connection, security information for operating the wearable transaction device. The security information may indicate one or more conditions for placing the wearable transaction device in a payment mode or a non-payment mode. The payment mode may allow the wearable transaction device to be used to perform a transaction. The non-payment mode may prevent the wearable transaction device from being used to perform any transaction. The electronic chip may receive a request to perform the transaction, and may determine, based on the security information, whether the wearable transaction device is in the payment mode or the non-payment mode. The electronic chip may selectively perform the transaction based on whether the wearable transaction device is in the payment mode or the non-payment mode.

BRIEF DESCRIPTION OF THE DRAWINGS

FIGS. 2A-2C are diagrams of one or more examples of use of the wearable transaction device of FIGS. 1A-1D.

DETAILED DESCRIPTION

Figure 1A:
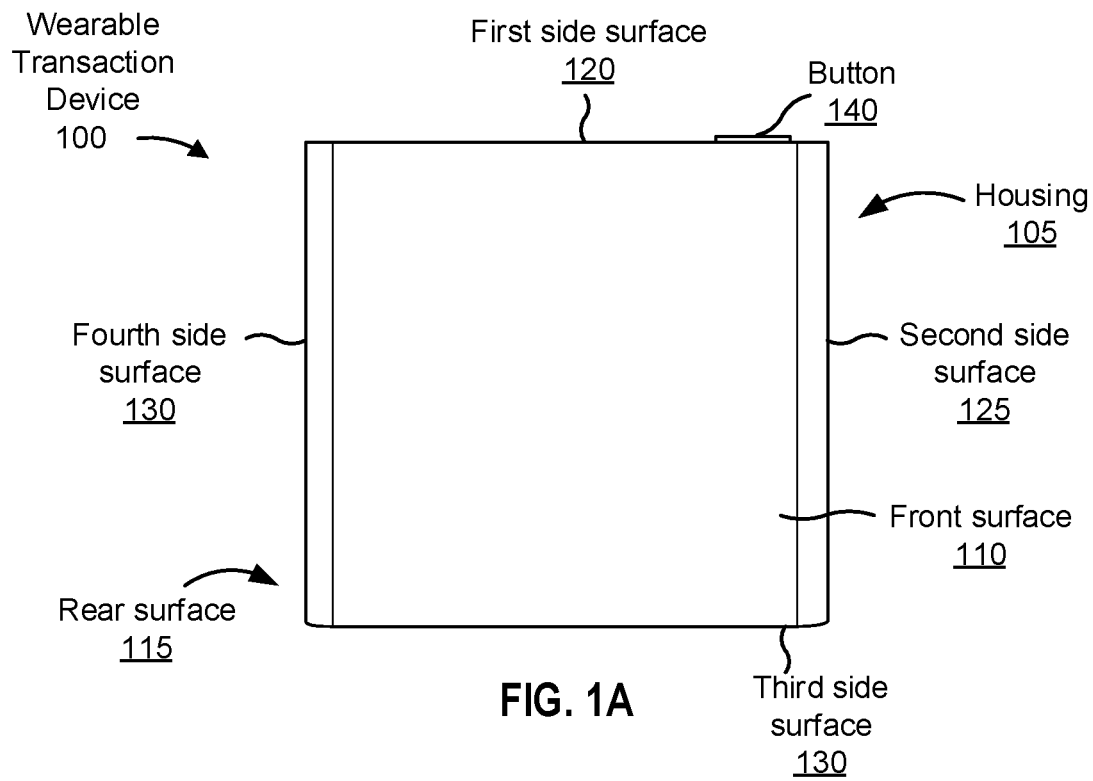
FIGS. 1A-1D are diagrams of one or more example implementations of a wearable transaction device described herein.

The following detailed description of example implementations refers to the accompanying drawings. The same reference numbers in different drawings may identify the same or similar elements.

A transaction card allows a user to make purchases without having to physically carry cash. As an added benefit, the transaction card may also allow the user to make purchases of a value exceeding a current value of cash in the user's bank account at a particular time. However, the transaction card also carries a risk that a malicious person may be able to fraudulently gain access to even larger quantities of money.

As a deterrent against a malicious person seeking to engage in fraud, an exterior of the transaction card may include the user's name and signature block for verification purposes. When a malicious person attempts to make a purchase at a transaction terminal that is supervised by an employee of a merchant, the employee may request that the malicious person prove that his name and/or signature match that of the transaction card. For example, the employee may ask the malicious person to provide photo identification or write their signature on a piece of paper without looking at the signature on the transaction card. In a situation where the malicious person is unable to prove ownership of the transaction card, the employee may deny the attempted transaction and notify law enforcement, and the malicious person may be subject to punishment. However, not all transaction terminals are supervised by an employee, and not all employees seek verification of ownership of the transaction card. This may leave some transaction cards susceptible to fraud.

While transaction card fraud causes a great deal of frustration for the user of the transaction card, it also wastes computing resources (e.g., processor, memory, or communication resources) and/or network resources to identify, investigate, and correct fraudulent charges. In particular, transaction card fraud wastes computing resources and/or network resources to provide reports of fraud to one or more devices, provide alerts of incidents of fraud to one or more devices, provide reimbursements and/or notifications of reimbursements to one or more devices, and/or the like.

Some implementations described herein provide a wearable transaction device that has multiple security measures to prevent fraud. In some implementations, the wearable transaction device may include an electronic chip within a housing. The electronic chip may be configured to detect a connection with and receive security information from a user device. The security information may indicate one or more conditions for placing the wearable transaction device in a payment mode, which may allow one or more transactions, or a non-payment mode, which prevents any transaction. Based on whether the wearable transaction device is in the payment mode or the non-payment mode, the electronic chip may perform the one or more transactions. In some implementation, the housing may be attached to a fastener component to allow a user to attach the wearable transaction device to a body part or to apparel of the user.

By having an electronic chip that prevents fraudulent transactions based upon detection of one or more conditions, the wearable transaction device goes beyond the deterrent system of a printed name and/or signature block of a transaction card and conserves computing resources and/or network resources that might otherwise be used to identify, investigate, and correct fraudulent charges. In particular, the wearable transaction device conserves computing resources and/or network resources that might otherwise be used to provide reports of fraud to one or more devices, conserves computing resources and/or network resources that might be used to provide alerts of incidents of fraud to one or more devices, conserves computing resources and/or network resources that might be used to provide reimbursements and/or notifications of reimbursements to one or more devices, and/or the like. Inclusion of a fastener component on the housing of the wearable transaction device also increases convenience for the user by allowing the user to wear the wearable transaction device on a body part or attach the wearable transaction device to apparel.

Figure 1B:
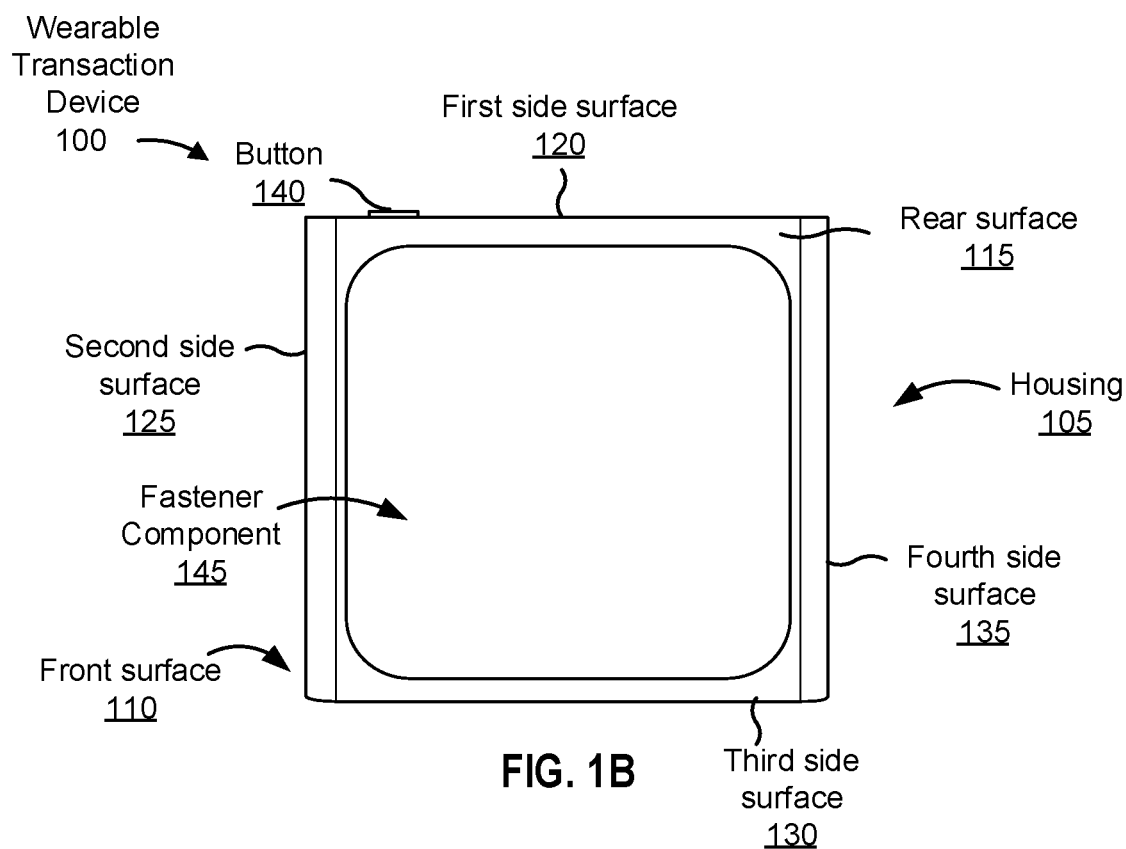
Figure 1C:
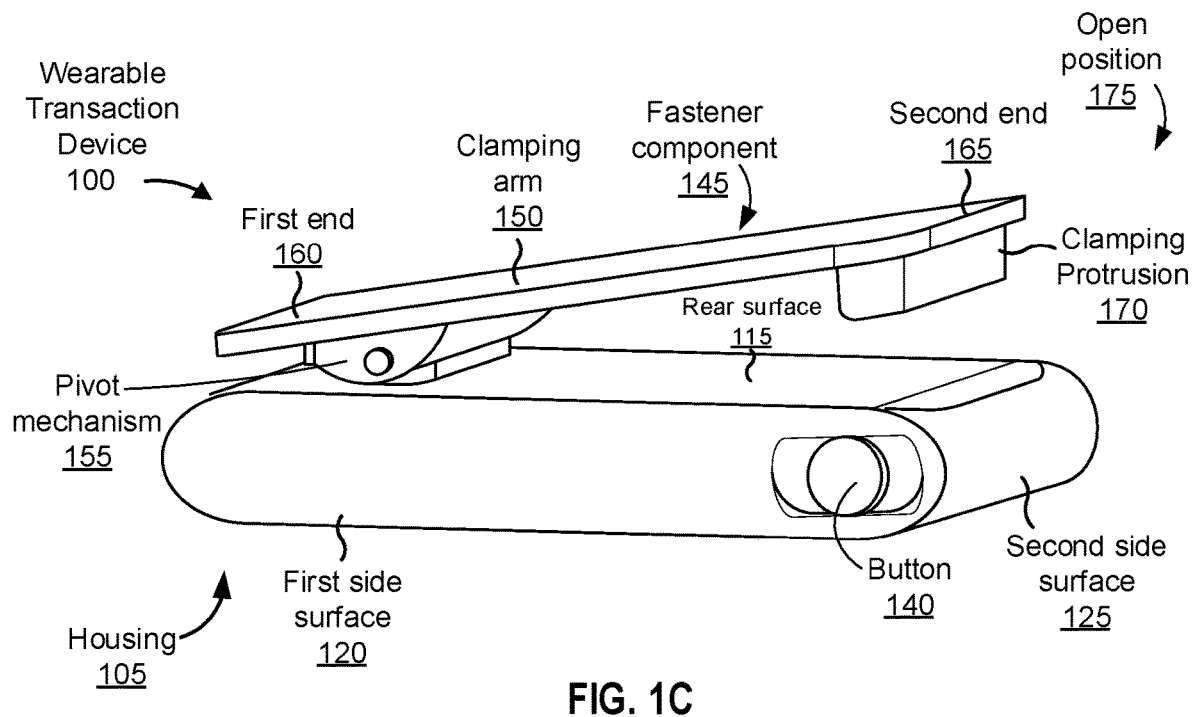
Figure 1D:
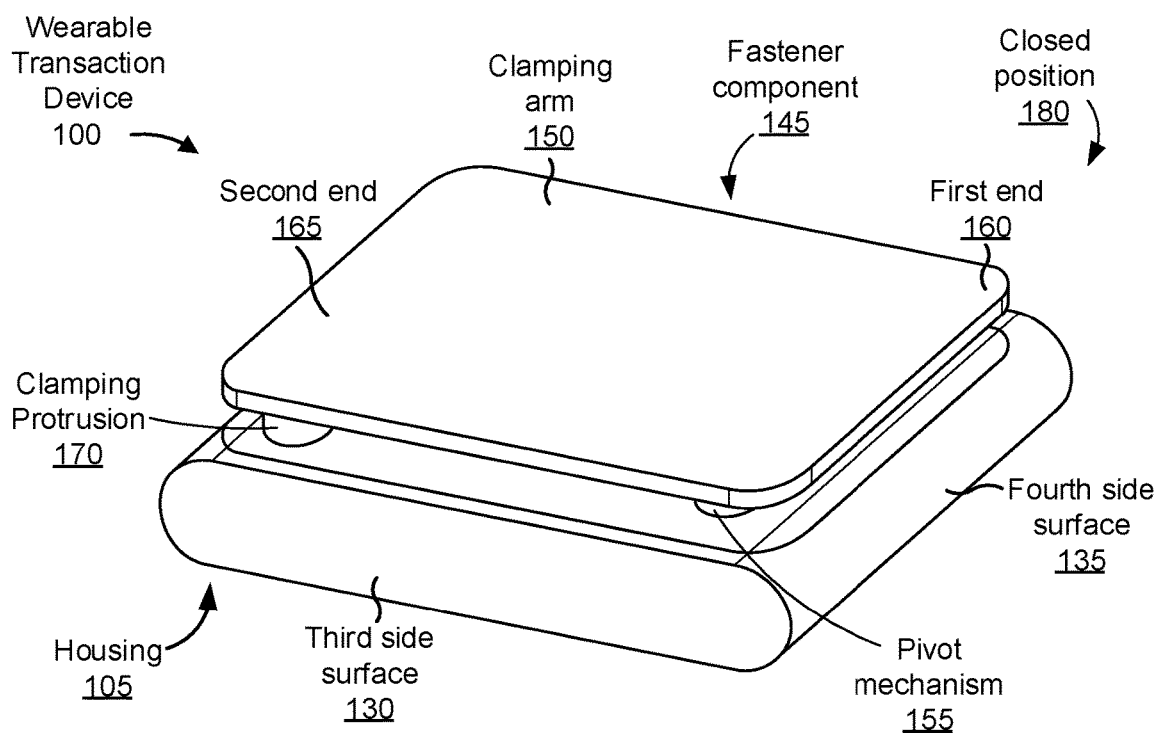

FIGS. 1A-1D are diagrams of one or more example implementations of a wearable transaction device 100 described herein. FIG. 1A is a diagram showing a front view of the wearable transaction device 100. FIG. 1B is a diagram showing a rear view of the wearable transaction device 100. FIG. 1C is a diagram showing an isometric view of the wearable transaction device 100. FIG. 1D is a diagram showing another isometric view of the wearable transaction device 100.

As shown in FIG. 1A, the wearable transaction device 100 may include a housing 105. The housing 105 may include a front surface 110 and a rear surface 115 opposed to the front surface 110. The housing 105 may further include a first side surface 120, a second side surface 125, a third side surface 130, and a fourth side surface 135, which connect the front surface 110 to the rear surface 115 to define an interior of the housing 105. In some implementations, the wearable transaction device 100 may further include a button 140 projecting from an exterior of the housing 105. In some implementations, the wearable transaction device 100 may include no input component on the exterior of the housing 105, including no button 140.

The front surface 110 may be monolithic with and define a single piece of material with at least one of the first side surface 120, the second side surface 125, the third side surface 130, the fourth side surface 135, or the rear surface 115. The single piece of material may be a durable material, including metal, plastic, and/or the like. For example, the single piece of material may be aluminum. In some implementations, the single piece of material may be free from any through holes and define a solid, continuous surface. In some implementations, the housing 105 may include one or more additional pieces of material to complete the housing 105 and define the interior. The one or more additional pieces of material may each be a durable material (e.g., metal, plastic, and/or the like). The one or more additional pieces of material may be the same material as the single piece of material. For example, the housing 105 may be entirely made of aluminum. In some implementations, the one or more additional pieces of material may be different material from the single piece of material. For example, the housing 105 may be made of aluminum and steel.

In some implementations, the front surface 110 may not be monolithic with the first side surface 120, the second side surface 125, the third side surface 130, the fourth side surface, or the rear surface 115. The housing 105 may include multiple pieces of material. The multiple pieces of material may be durable material, such as metal, plastic, and/or the like. In some implementations, the multiple pieces of material may be the same material. For example, the housing 105 may be made entirely of aluminum. In some implementations, the multiple pieces of material may be different material. For example, the housing 105 may be made of aluminum and steel or aluminum and plastic.

While the front surface 110 and the rear surface 115 are each shown as having a substantially rectangular shape, the front surface 110 and/or the rear surface 115 may have a different shape, such as a circular shape, an oval shape, a triangular shape, and/or the like. Accordingly, the housing 105 may have a different number of side surfaces. In some implementations, the housing 105 may form a three-dimensional shape in the form of a sphere, a pyramid, a star, and/or the like.

The housing 105 may be sized such that the front surface 110, the rear surface 115, the first side surface 120, the second side surface 125, the third side surface 130, and the fourth side surface 135 each has an area less than 40 centimeters squared ($cm^2$). In some implementations, the housing 105 may be sized such that the front surface 110, the rear surface 115, the first side surface 120, the second side surface 125, the third side surface 130, and the fourth side surface 135 each has an area less than 8 $cm^2$. In some implementations, the housing 105 may be sized such that the front surface 110 and the rear surface 115 each has an area less than 8 $cm^2$, and the first side surface 120, the second side surface 125, the third side surface 130, and the fourth side surface 135 each has an area less than 2 $cm^2$.

The wearable transaction device 100 may have a weight less than 100 grams (g). In some implementations, the weight may be less than 28 g. In some implementations, the weight may be less than 12 g. In some implementations, the weight may be less than 7 g. In some implementations, the weight may be between 3 g and 7 g. In some implementations, the weight may be between 4 g and 5 g.

As shown in FIG. 1B, in some implementations, the wearable transaction device 100 may include a fastener component 145 attached to and/or projecting from the rear surface 115 of the housing 105. As shown in FIG. 1C, the fastener component 145 may include a clamping arm 150 pivotably attached to the rear surface 115 of the housing 105 via a pivot mechanism 155. The clamping arm 150 has a first end 160 and a second end 165. The first end 160 of the clamping arm 150 is attached to the pivot mechanism 155. The second end 165 of the clamping arm 150 includes a clamping protrusion 170. Together, the fastener component 145 and the housing 105 may define a clip that may be opened and closed. FIG. 1C shows the fastener component 145 pivoted to an open position 175. FIG. 1D shows the fastener component 145 pivoted to a closed position 180. In the closed position 180, the clamping protrusion 170 contacts the rear surface 115 of the housing 105.

To maintain the fastener component 145 in the closed position 180, in some implementations, the pivot mechanism 155 may include a biasing element (e.g., a coil spring, a leaf spring, a torsional spring, and/or the like). In some implementations, the pivot mechanism 155 may include a metal projection that is adapted to complete a circuit in the interior of the housing 105 when the fastener component 145 is in the open position 175 or the closed position 180. In some implementations, the pivot mechanism 155 may include a locking element to retain the fastener component 145 in the closed position 180. In some implementations, the button 140 may be adapted to release the locking element and move the fastener component 145 from the closed position 180 to the open position 175.

In some implementations, the fastener component 145 may have a different structure. For example, the fastener component 145 may be a support arm fixedly attached to and/or projecting from the rear surface 115 of the housing 105. The support arm may include a portion that extends substantially parallel to the rear surface 115 of the housing. The support arm and the housing 105 together may define a hook. In some implementations, the fastener component 145 may be a pin backing slidably and removably attached to a pin that projects from the rear surface 115 of the housing 105. In an open position, the pin backing is directly attached to the pin. In a closed position, the pin backing is removed from the pin. In some implementations, the fastener component 145 may be a pin pivotably attached to the rear surface 115 of the housing 105. In an open position, a tip of the pin is spaced away from the housing 105. In a closed position, the tip of the pin is fixed to the housing 105. In some implementations, the fastener component 145 may be attached to and/or project from the first side surface 120, the second side surface 125, the third side surface 130, or the fourth side surface 135.

In some implementations, the wearable transaction device 100 may not include the fastener component 145. The wearable transaction device 100 may be portable and/or handheld. In some implementations, each of the front surface 110, the rear surface 115, the first side surface 120, the second side surface 125, the third side surface 130, and the fourth side surface 135 may be substantially smooth and free from any projections, protrusions, and/or the like.

As indicated above, FIGS. 1A-1D are provided merely as one or more examples. Other examples are possible and may be different from what is described with regards to FIGS. 1A-1D.

FIGS. 2A-2C are diagrams of one or more examples of use of the wearable transaction device 100 described herein. As shown in FIGS. 2A-2C, the wearable transaction device 100 may be attached to a body part of a user or to a portion of apparel of the user.

In some implementations, as is shown in FIG. 2A, the wearable transaction device 100 may be attached to an ear 205 of a user via the fastener component 145 such that the wearable transaction device 100 is worn as an earring. In some implementations, when the fastener component 145 includes a clamping arm (e.g., the clamping arm 150 of FIGS. 1C-1D), the wearable transaction device 100 may be adapted to retain the ear 205 of the user between the clamping arm 150 and the housing 105. In some implementations, when the fastener component 145 takes the form of a support arm fixedly attached to and/or projecting from the housing 105, the wearable transaction device 100 may retain the ear 205 of the user between the support arm and the housing 105. In some implementations, when the fastener component 145 takes the form of a pin backing slidably and removably attached to a pin that projects from the housing 105, the wearable transaction device 100 may penetrate a piercing in the ear 205 of the user. In some implementations, when the fastener component 145 takes the form of a pin pivotably attached to the housing 105, the wearable transaction device 100 may be adapted to penetrate the piercing of the ear 205 of the user.

In some implementations, as is shown in FIG. 2B, the wearable transaction device 100 may be attached to a shirt 210 of the user via the fastener component 145. In some implementations, when the fastener component 145 includes a clamping arm (e.g., the clamping arm 150 of FIGS. 1C-1D), the wearable transaction device 100 may be adapted to retain a portion of the shirt 210 of the user between the clamping arm 150 and the housing 105. In some implementations, when the fastener component 145 takes the form of a support arm fixedly attached to and/or projecting from the housing 105, the wearable transaction device 100 may retain the portion of the shirt 210 between the support arm and the housing 105. In some implementations, when the fastener component 145 takes the form of a pin backing slidably and removably attached to a pin that projects from the housing 105, the wearable transaction device may penetrate the shirt 210 of the user. In some implementations, when the fastener component 145 takes the form of a pin pivotably attached to the housing 105, the wearable transaction device 100 may penetrate the shirt 210 of the user.

In some implementations, as is shown in FIG. 2C, the wearable transaction device 100 may be attached to a shoe 215 of the user via the fastener component 145. In some implementations, when the fastener component 145 includes a clamping arm (e.g., the clamping arm 150 of FIGS. 1C-1D), the wearable transaction device 100 may be adapted to retain a shoelace or another portion of the shoe 215 between the clamping arm 150 and the housing 105. In some implementations, when the fastener component 145 takes the form of a support arm fixedly attached to and/or projecting from the housing 105, the wearable transaction device 100 may retain the shoelace or the other portion of the shoe 215 between the support arm and the housing 105. In some implementations, when the fastener component 145 takes the form of a pin backing slidably and removably attached to a pin that projects from the housing 105, the wearable transaction device 100 may penetrate the shoe 215 of the user. In some implementations, when the fastener component 145 takes the form of a pin pivotably attached to the housing 105, the wearable transaction device 100 may penetrate the shoe 215 of the user.

In some implementations, when the wearable transaction device 100 does not include the fastener component 145, the wearable transaction device 100 may be worn and/or carried by the user in a different manner. In some implementations, the wearable transaction device 100 may be worn in a pocket of the user. In some implementations, the wearable transaction device 100 may be carried in a purse, bag, and/or the like.

As indicated above, FIGS. 2A-2C are provided merely as examples. Other examples are possible and may be different from what is described with regards to FIGS. 2A-2C.

Figure 3:
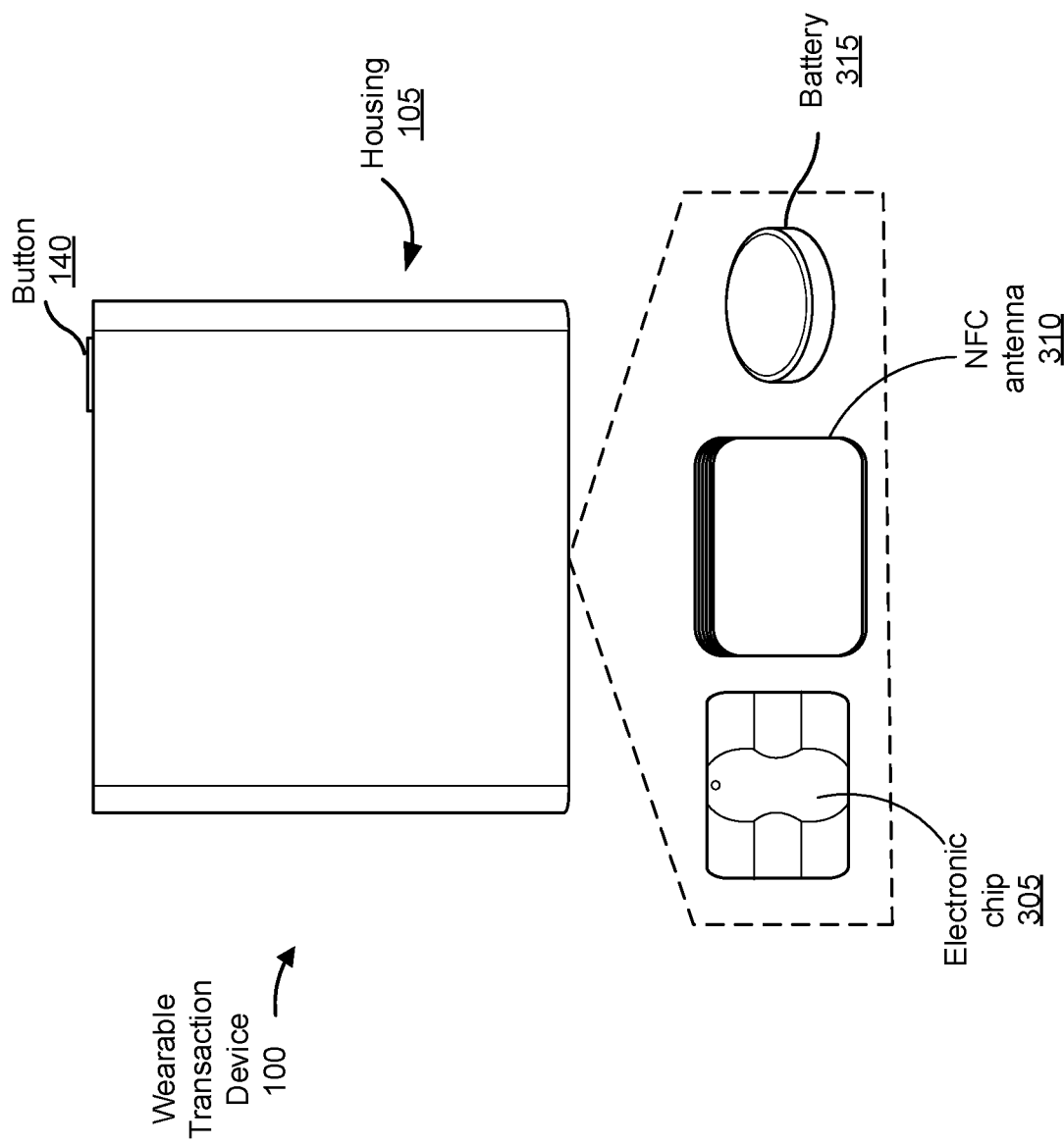
FIG. 3 is a diagram of one or more example implementations of internal components of the wearable transaction device of FIGS. 1A-1D.

FIG. 3 is a diagram of one or more example implementations of internal components of the wearable transaction device of FIGS. 1A-1D. As shown in FIG. 3, the housing 105 of the wearable transaction device 100 may enclose an electronic chip 305 and a near field communication (NFC) antenna 310 within the interior of the housing 105. The electronic chip 305 may be an integrated circuit chip (e.g., an EMV chip). The NFC antenna 310 may be a conductive piece of metal that is arranged in a coil shape within the interior of the housing 105. When the wearable transaction device 100 is within an electromagnetic field, the NFC antenna 310 may supply power to the electronic chip 305 and transmit information to make a transaction.

In some implementations, the housing 105 may enclose a battery 315, which may supply power to the electronic chip 305. In some implementations, the battery 315 may selectively provide power to the electronic chip 305. For example, the battery 315 may provide power to the electronic chip 305 when the button 140 is in a first position and not provide power to the electronic chip 305 when the button 140 is in a second position. The button 140 may be configured to be slid along the housing 105 or depressed towards the interior of the housing 105 to selectively place the wearable transaction device 100 in a power-on mode or a power-off mode. When the wearable transaction device 100 is in the power-on mode, the battery 315 may supply power to the electronic chip 305. In some implementations, the battery 315 may assist the NFC antenna 310 in supplying power to the electronic chip 305. When the wearable transaction device 100 is in the power-off mode, the battery 315 may be prevented from supplying power to the electronic chip 305.

In some implementations, the wearable transaction device 100 may include one or more sensors for sensing information. In some implementations, the one or more sensors may include an accelerometer to measure a rate of acceleration and/or deceleration of the wearable transaction device 100. In some implementations, the one or more sensors may include a gyroscope to measure a rate of velocity of the wearable transaction device 100. In some implementations, the one or more sensors may include a global positioning system (GPS) component to track a location of the wearable transaction device 100.

As indicated above, FIG. 3 is provided merely as an example. Other examples are possible and may be different from what is described with regards to FIG. 3.

FIGS. 4A-4E are diagrams of one or more example implementations 400 of the wearable transaction device 100 of FIGS. 1A-1D. With respect to FIGS. 4A-4E, the wearable transaction device 100 will be described as performing various functions. In practice, however, the electronic chip 305, possibly in combination with one or more additional internal components (e.g. the NFC antenna 310, the battery 315, and/or the like) of the wearable transaction device 100, may perform one or more or all of the functions described as being performed by the wearable transaction device 100.

Figure 4A:
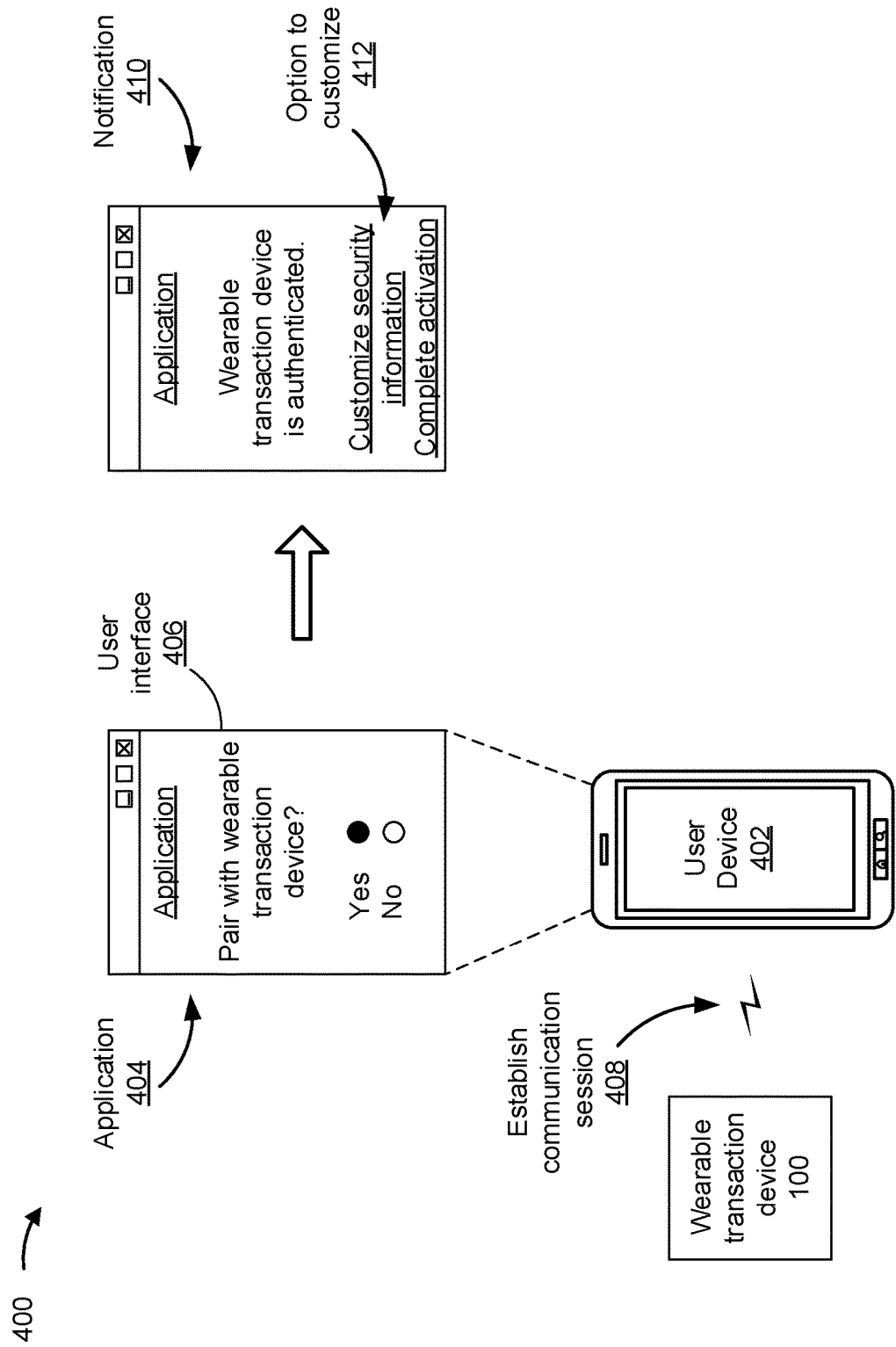
FIGS. 4A-4E are diagrams of one or more example implementations of the wearable transaction device of FIGS. 1A-1D.
Figure 4B:
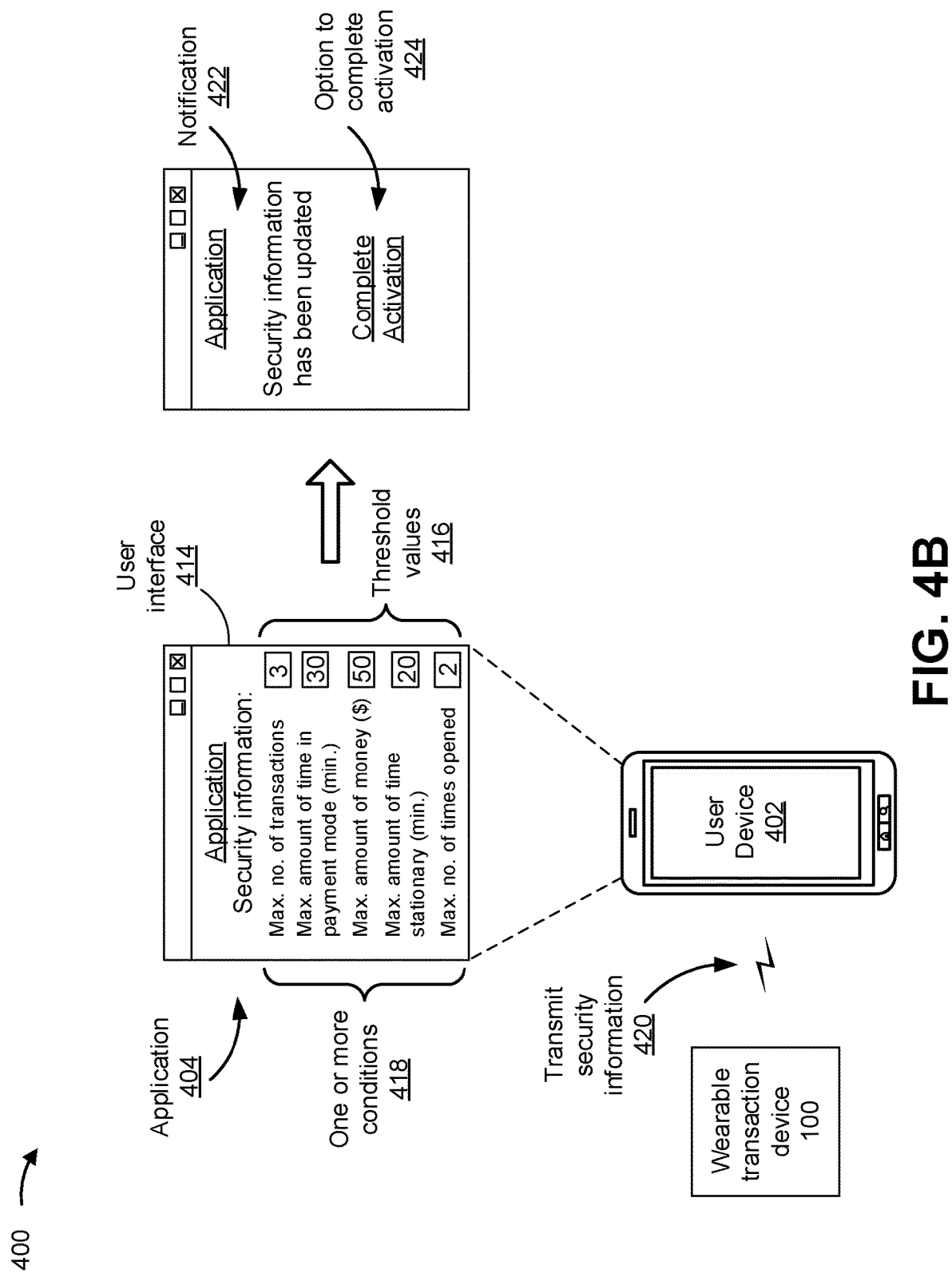
Figure 4C:
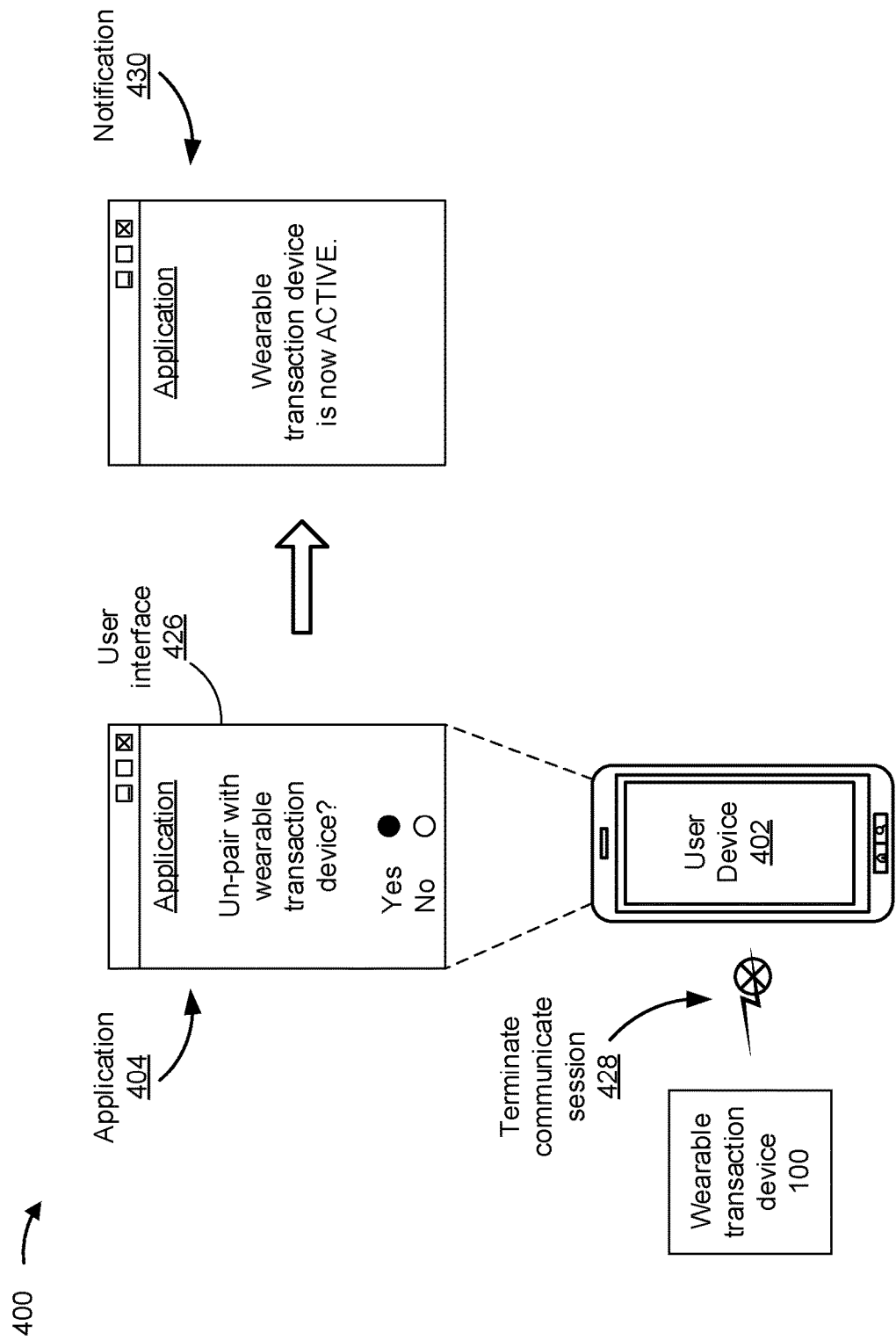
Figure 4D:
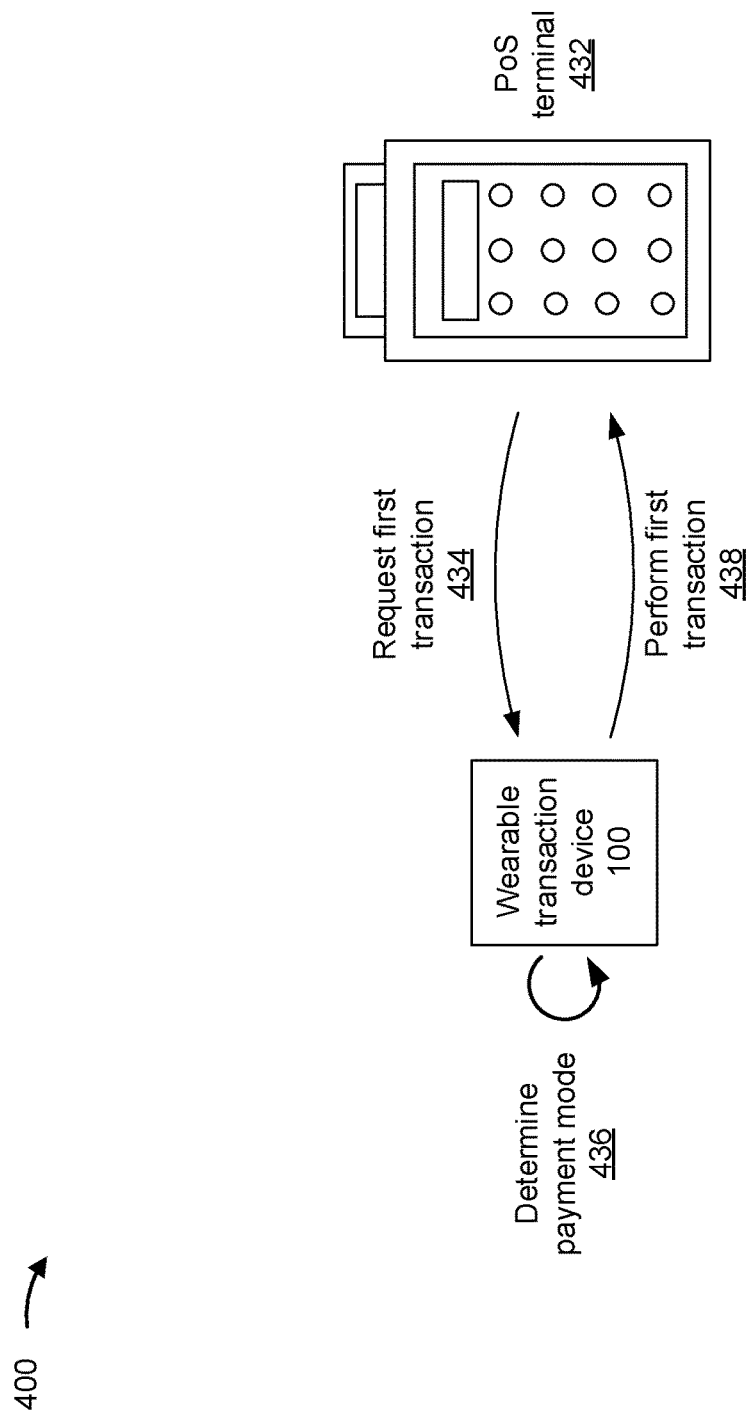
Figure 4E:
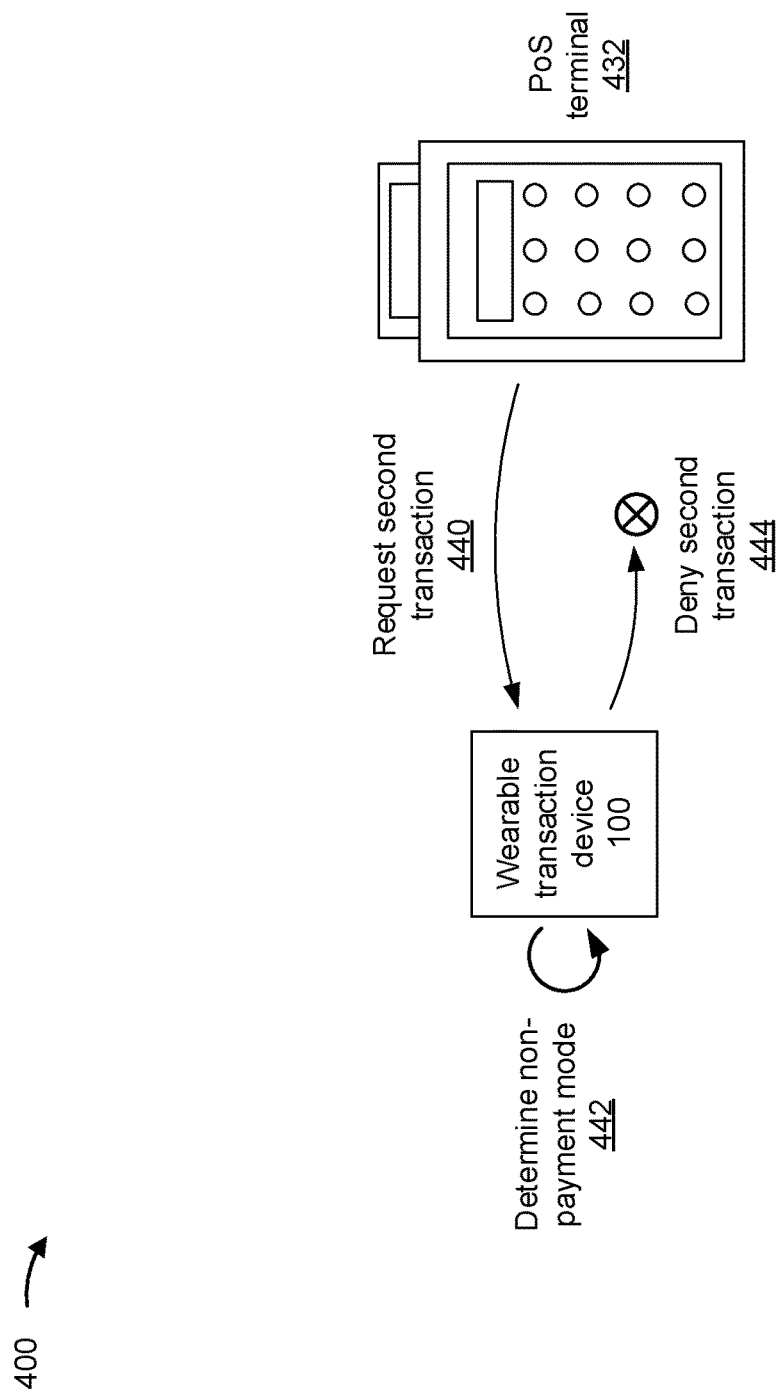

FIGS. 4A-4C illustrate one or more examples of the wearable transaction device 100 interacting with a user device 402 to configure the wearable transaction device 100 for operation. FIGS. 4D-4E illustrate one or more examples of the wearable transaction device 100 interacting with a point of sale (PoS) terminal to selectively perform a transaction.

In the one or more examples of FIGS. 4A-4C, the wearable transaction device 100 and the user device 402 are both associated with a user. As shown in FIG. 4A, the user device 402 may include an application 404 related to the wearable transaction device 100. The application 404, once opened by the user, may provide a user interface 406 that inquires whether the user wants to pair the user device 402 with the wearable transaction device 100. If the user wants to pair the user device 402 with the wearable transaction device 100, the user may select an option (e.g., "yes" and/or the like) and bring the wearable transaction device 100 into a range to permit the wearable transaction device 100 to communicate with the user device 402 via wireless communication.

In some implementations, when the wearable transaction device 100 includes the battery 315 and/or the button 140 is positioned such that the wearable transaction device 100 is in the power-on mode, the wireless communication may be via Bluetooth, Wi-Fi, NFC, and/or the like. In some implementations, when the wearable transaction device 100 does not include the battery 315 and/or the button 140 is positioned such that the wearable transaction device 100 is in the power-off mode, the wireless communication may be via NFC.

Once the user positions the wearable transaction device 100 within the range of the user device 402 to permit the wireless communication, the wearable transaction device 100 and the user device 402 may cross-authenticate to establish a communication session, as shown by reference number 408. Thus, the wearable transaction device 100 authenticates the user device 402, and the user device 402 authenticates the wearable transaction device 100. In some implementations, the wearable transaction device 100 and the user device 402 may perform a one-way authentication, where the user device 402 authenticates the wearable transaction device 100 and the wearable transaction device 100 does not authenticate the user device 402, or vice versa.

Once the wearable transaction device 100 and the user device 402 are paired, the application 404 may provide a notification 410 to the user that the wearable transaction device 100 has been authenticated as being associated with the user. In some implementations, and as shown by reference number 412, the application 404 may allow the user to customize security information related to the wearable transaction device 100 or to complete activation of the wearable transaction device 100.

In FIG. 4B, assume that the user utilizes the application 404 to customize the security information related to the wearable transaction device 100. For security purposes, the application 404 may provide a user interface 414 that allows the user to control how the wearable transaction device 100 is to be used. For example, as shown in FIG. 4B, the application 404 may allow the user to enter threshold values 416 of one or more conditions 418 related to use of the wearable transaction device 100. If the wearable transaction device 100 is later used in such a way that does not satisfy one or more (or all) of the threshold values 416, the wearable transaction device 100 may be placed in a payment mode. The payment mode may allow the wearable transaction device 100 to be used to perform a transaction. If, however, the wearable transaction device 100 is attempted to be used in such a way that satisfies one or more (or all) of the threshold values 416, the wearable transaction device 100 may be placed in a non-payment mode. The non-payment mode may prevent the wearable transaction device 100 from being used to perform any transaction until the wearable transaction device 100 is re-paired with the user device 402.

In some implementations, the user may wish to control how many times the wearable transaction device 100 can be used to perform transactions without being re-paired with the user device 402. In this case, the user may use the application 404 to input a quantity threshold value that indicates how many times the wearable transaction device 100 can be used to perform transactions without being re-paired with the user device 402. When the wearable transaction device 100 is used to perform a number of transactions that satisfies the quantity threshold value, this may indicate that a malicious person has obtained the wearable transaction device 100. Accordingly, the one or more conditions 418 may indicate the quantity threshold value. For example, as shown in FIG. 4B, the user may input the quantity threshold value of three. Thus, the wearable transaction device 100 may be limited to performing three transactions (e.g., a purchase of a meal at a restaurant, a purchase of a ticket at a movie theater, and then a purchase of popcorn at the movie theater) while the wearable transaction device 100 is in the payment mode. After the third transaction is performed, the wearable transaction device 100 may be placed in the non-payment mode and may need to be re-paired with the user device 402 (e.g., as shown in FIG. 4A) to be used to perform a further transaction.

Additionally, or alternatively, the user may wish to control how much time the wearable transaction device 100 can remain in the payment mode and be able to perform transactions without being re-paired with the user device 402. In this case, the user may use the application 404 to input a timing threshold value that indicates how much time the wearable transaction device 100 can remain in the payment mode and be able to perform transactions without being re-paired with the user device 402. When the wearable transaction device 100 is used for an amount of time that satisfies the timing threshold value, this may make the wearable transaction device 100 susceptible to theft. Accordingly, the one or more conditions 418 may indicate the timing threshold value. For example, as shown in FIG. 4B, the user may input the timing threshold value of 30 minutes. Thus, the wearable transaction device 100 may only be capable of performing transactions for 30 minutes while the wearable transaction device 100 is in the payment mode. After 30 minutes has passed, the wearable transaction device 100 may be placed in the non-payment mode and may need to be re-paired with the user device 402 (e.g. as shown in FIG. 4A) to be used to perform a further transaction.

Additionally, or alternatively, the user may wish to control how much money can be spent using the wearable transaction device 100 without being re-paired with the user device 402. In this case, the user may use the application 404 to input a money threshold value that indicates how much money can be spent using the wearable transaction device 100 without the wearable transaction device 100 being re-paired with the user device 402. When the wearable transaction device 100 is used to perform a transaction with a charge that satisfies the money threshold value, this may indicate that the wearable transaction device 100 has been obtained by a malicious person. Accordingly, the one or more conditions 418 may indicate the money threshold value. For example, as shown in FIG. 4B, the user may input the money threshold value of $50. Thus, the wearable transaction device 100 may be limited to performing transactions having a maximum value of $50 while the wearable transaction device 100 is in the payment mode. If a transaction having a charge of more than $50 is attempted, the wearable transaction device 100 may be placed in the non-payment mode and may need to be re-paired with the user device 402 (e.g., as shown in FIG. 4A) to be used to perform a further transaction.

Additionally, or alternatively, the user may wish to control how long the wearable transaction device 100 can be in the payment mode while the wearable transaction device 100 remains stationary. In this case, the user may use the application 404 to input a stationary threshold value that indicates how long the wearable transaction device 100 can be in the payment mode while the wearable transaction device 100 remains stationary. When the wearable transaction device 100 remains stationary for an amount of time that satisfies the stationary threshold value (e.g., detectable using a sensor of the wearable transaction device 100), this prolonged state of being stationary may indicate that the wearable transaction device 100 has been dropped and/or lost by the user. Accordingly, the one or more conditions 418 may indicate the stationary threshold value. For example, as shown in FIG. 4B, the user may enter the stationary threshold value of 20 minutes. Thus, the wearable transaction device 100 may only be capable of performing transactions if the wearable transaction device 100 has remained stationary while in the payment mode for 20 minutes or less. After 20 minutes of being stationary has passed, the wearable transaction device 100 may be placed in the non-payment mode and may need to be re-paired with the user device 402 (e.g. as shown in FIG. 4A) to be used to perform a further transaction.

Additionally, or alternatively, the user may wish to control how many times the fastener component 145 can been opened or closed without re-pairing the wearable transaction device 100 with the user device 402. In this case, the user may use the application 404 to input a fastener threshold value that indicates how many times the fastener component 145 can be opened or closed without re-pairing the wearable transaction device 100 with the user device 402. When fastener component 145 has been opened or closed for a number of times that satisfies the fastener threshold value (e.g., detectable using a sensor or switch of the wearable transaction device 100) while the wearable transaction device 100 is in the payment mode, this may indicate that the wearable transaction device 100 has been obtained by another person (e.g., if the other person found the wearable transaction device 100 and then re-opened the fastener component 145 to wear the wearable transaction device 100 on an article of clothing). Accordingly, the one or more conditions 418 may indicate the fastener threshold value. For example, as shown in FIG. 4B, the user may select the fastener threshold value of two, since the fastener component 145 may only need to be opened once or twice for the user to wear the wearable transaction device 100. Thus, the wearable transaction device 100 may be capable of performing transactions only if the fastener component 145 has been opened once or twice. If the fastener component 145 is opened a third time, the wearable transaction device 100 may be placed in the non-payment mode and may need to be re-paired with the user device 402 (e.g., as show in FIG. 4A) to be used to perform a further transaction.

In some implementations, the one or more conditions 418 may relate to one or more virtual credit card numbers to be used for transactions associated with the wearable transaction device 100. For example, the application 404 may generate one or more virtual credit card numbers associated with respective one or more credit card accounts. Using the application 404 and in relation to the one or more virtual credit card numbers, the user may set a spending limit, set an expiration time and/or date, specify a single merchant that may receive payments, and/or the like. If the user is concerned about fraudulent use of the wearable transaction device 100, the user may cancel and/or delete the one or more virtual credit card numbers without affecting the respective one or more credit card accounts or other card numbers of the user. In some implementations, the one or more conditions 418 may relate to one or more static credit card numbers associated with respective one or more credit card accounts.

Additionally, or alternatively, the one or more conditions 418 may correlate the closed position 180 of the fastener component 145 with the non-payment mode. Accordingly, the wearable transaction device 100 may prevent transactions while the fastener component 145 is in the closed position 180. For example, the wearable transaction device 100 may be capable of performing transactions only when the fastener component 145 is held in the open position 175 (e.g., when the wearable transaction device 100 is worn on a user or apparel of the user, as shown in FIGS. 2A-2C).

The conditions identified above for placing the wearable transaction device 100 in the non-payment mode are provided merely as examples. In practice, other conditions may additionally, or alternatively, be used. In some implementations, a single condition may be used. In some implementations, a combination of conditions may be used. When a combination of conditions is used, in some implementations, satisfaction of any one of the conditions may be used to place the wearable transaction device 100 in the non-payment mode. When a combination of conditions is used, in some implementations, satisfaction of two or more of the conditions may be used to place the wearable transaction device 100 in the non-payment mode. In some implementations, one or more conditions, similar to the conditions identified above, may be used for placing the wearable transaction device 100 in the payment mode. In some implementations, one or more conditions, different from the conditions identified above, may be used for placing the wearable transaction device 100 in the payment mode.

While the above description indicated that the wearable transaction device 100 may be re-paired with the user device 402 to restore the wearable transaction device 100 to the payment mode after the wearable transaction device 100 is placed in the non-payment mode, this is intended as an example. As another example, the user may restore the wearable transaction device 100 to the payment mode by utilizing the wearable transaction device 100 in a certain manner to indicate ownership (e.g., to match a code previously set in the security information via the application 404). As another example, the user may restore the wearable transaction device 100 to the payment mode by moving the wearable transaction device in a certain manner and/or pattern (e.g., detectable using a sensor of the wearable transaction device 100). As another example, the user may restore the wearable transaction device 100 to the payment mode by moving the button 140 in a certain manner (e.g., turning the wearable transaction device 100 on and/or off a certain number of times). As another example, the user may restore the wearable transaction device 100 to the payment mode by moving the fastener component 145 in a certain manner (e.g., opening and/or closing the fastener component 145 a certain number of times). The user may restore the wearable transaction device 100 to the payment mode in yet other ways.

After the user has completed entering the security information, the user device 402 may transmit the security information to the wearable transaction device 100, as shown by reference number 420 in FIG. 4B. The security information may be received by and stored in memory of the wearable transaction device 100, and the security information may be accessible to the electronic chip 305. The wearable transaction device 100 may notify the user device 402 that the security information has been successfully stored. The application 404, of the user device 402, may provide a notification 422 to the user that the security information has been updated. In some implementations, and as shown by reference number 424, the application 404 may provide the user with an option to complete activation of the wearable transaction device 100.

In FIG. 4C, assume that the user selects the option to complete activation of the wearable transaction device 100. The application 404 may provide a user interface 426 that inquires whether the user wants to un-pair the user device 402 with the wearable transaction device 100. If the user wants to un-pair the user device 402 with the wearable transaction device 100, the user may select an option (e.g., "yes" and/or the like). After the user selects the option to un-pair the user device 402 with the wearable transaction device 100, the user device 402 may send a signal to activate the wearable transaction device 100 and, as shown by reference number 428, may terminate the communication session. Once the wearable transaction device 100 and the user device 402 are un-paired, the application 404 may provide a notification 430 to the user that the wearable transaction device 100 is in the active mode and therefore ready for use to perform transactions independent of the user device 402 and/or any other form of payment.

Additionally, or alternatively, after the security information has been transmitted from the user device 402 to the wearable transaction device 100, the user may terminate the communication session by bringing the wearable transaction device 100 out of the range that permits the wearable transaction device 100 to communicate with the user device 402 via the wireless communication. For example, if the wireless communication was via NFC, the user may separate the wearable transaction device 100 from the user device 402 by more than 10 cm. In some implementations, when the wireless communication was of a type that requires the battery 315, the user may slide or depress the button 140 to place the wearable transaction device 100 in the power-off mode to terminate the communication session and preserve the battery 315 for future use. In some implementations, the user may close the application 404 and/or turn off the user device 402 to terminate the communication session.

In some implementations, the application 404 may not allow the user to customize the security information related to use of the wearable transaction device 100. Accordingly, the security information, which may indicate any or all of the conditions previously set forth, may be pre-programmed into the memory of the wearable transaction device 100 and accessible by the electronic chip 305 of the wearable transaction device 100. After the wearable transaction device 100 is paired with the user device 402, the user device 402 may send a signal to activate the wearable transaction device 100 and terminate the communication session. Once the wearable transaction device 100 is un-paired from the user device 402, the wearable transaction device 100 may be ready for use to perform transactions independent of the user device 402 and/or any other form of payment.

In some implementations (e.g., as indicated by reference number 412 in FIG. 4A), the application 404 may provide the user with an option to accept default settings of the security information or to customize the security information according to personal preference. In some implementations, the default settings, which may indicate any or all of the conditions previously set forth, may be pre-programmed into the memory of the wearable transaction device 100. In some implementations, when the user chooses to accept the default settings of the security information, the user device 402 may send a signal to the wearable transaction device 100 to use the default settings of the security information stored within the memory. After the user device 402 sends the signal related to the default settings, the user device 402 may send a signal to activate the wearable transaction device 100 and terminate the communication session. Once the wearable transaction device 100 is un-paired from the user device 402, the wearable transaction device 100 may be ready for use to perform transactions independent of the user device 402 and/or any other form of payment.

In some implementations, when the user chooses to accept the default settings of the security information, the user device 402 may transmit the security information to the wearable transaction device 100. The security information may be received by and stored in the memory of the wearable transaction device 100, and the security information may be accessible to the electronic chip 305. Once the security information is stored in the memory, the user device 402 may send a signal to activate the wearable transaction device 100 and terminate the communication session. After the wearable transaction device 100 is un-paired from the user device 402, the wearable transaction device 100 may be ready for use to perform transactions independent of the user device 402 and/or any other form of payment.

Once the wearable transaction device 100 is ready to be used to perform transactions, as illustrated in connection with FIGS. 4D-4E, the wearable transaction device 100 may interact with a PoS terminal 432 to selectively perform a transaction. The PoS terminal 432 may be associated with a merchant (e.g., a restaurant, a store, and/or the like). As shown in FIG. 4D, when the user places the wearable transaction device 100 within a range that permits NFC with the PoS terminal 432, the PoS terminal 432 may request a first transaction (e.g., payment of $100 in exchange for a concert ticket), as shown by reference number 434. Before performing the first transaction, the wearable transaction device 100 may determine, as shown by reference number 436 and based on the security information stored within the memory, that the wearable transaction device 100 is in the payment mode. For example, the security information may indicate a combination of conditions, which needs to be satisfied, that indicate a money threshold value of $50 and a quantity threshold value of 2. While the first transaction satisfies the money threshold value, the first transaction does not satisfy the quantity threshold value. Because the first transaction does not satisfy both conditions, the wearable transaction device 100 remains in the payment mode. Therefore, the wearable transaction device 100 may perform the first transaction, as shown by reference number 438, and transfer $100 to the merchant, via the PoS terminal 432. For example, after the user positions the wearable transaction device 100 close enough to the PoS terminal 432 to perform the first transaction, the PoS terminal 432 transmits transaction information to a processor, and then through a card network to an issuing bank for approval. Once approved, the issuing bank transfers the $100 from an account of the user to an account of the merchant.

As another example, the security information may indicate that only a single condition of the combination of conditions needs to be satisfied in order to place the wearable transaction device 100 in the non-payment mode. In this case, because the first transaction satisfies the money threshold value of $50, the wearable transaction device 100 may instead determine that the wearable transaction device 100 is to transition to the non-payment mode. As described below in connection with FIG. 4E, the wearable transaction device 100 may therefore deny the first transaction.

As shown in FIG. 4E, in another example, when the user places the wearable transaction device 100 within the range that permits NFC with the PoS terminal 432, the PoS terminal 432 may request a second transaction (e.g., payment of $500 in exchange for multiple items of apparel), as shown by reference number 440, after the wearable transaction device 100 performed the first transaction (e.g., as shown by reference number 438 in FIG. 4D). Before performing the second transaction, the wearable transaction device 100 may determine, as shown by reference number 442 and based on the security information stored within the memory, that the wearable transaction device 100 is in the non-payment mode. For example, the security information may indicate the combination of conditions that indicate the money threshold value of $50 and the quantity threshold value of 2. Because the second transaction satisfies both the money threshold value and the quantity threshold value, the wearable transaction device 100 is placed in the non-payment mode. Therefore, the wearable transaction device 100 may deny the second transaction, as shown by reference number 444.

As another example, the security information may indicate that only a single condition of the combination of conditions needs to be satisfied in order to place the wearable transaction device 100 in the non-payment mode. In this case, because the second transaction satisfies the money threshold value of $50, the wearable transaction device 100 may again determine that the wearable transaction device 100 is to transition to the non-payment mode. Accordingly, in either example involving the second transaction, the wearable transaction device 100 may deny the second transaction.

After denial of a transaction, in some implementations, the wearable transaction device 100 may be configured to send a message to the user device 402 and/or another device (e.g., a merchant device, such as the PoS terminal 432, a law enforcement device, and/or the like) to indicate that the wearable transaction device 100 is in the non-payment mode and that a transaction was attempted and/or denied. The message may provide additional details of the attempted transaction, including a location of the PoS terminal 432, one or more threshold values 416 satisfied, and/or the like. The user may re-pair the wearable transaction device 100 with the user device 402 to change the wearable transaction device 100 from the non-payment mode to the payment mode and reattempt the second transaction.

As indicated above, FIGS. 4A-4E are provided merely as examples. Other examples are possible and may be different from what is described with regards to FIGS. 4A-4E.

Figure 5:
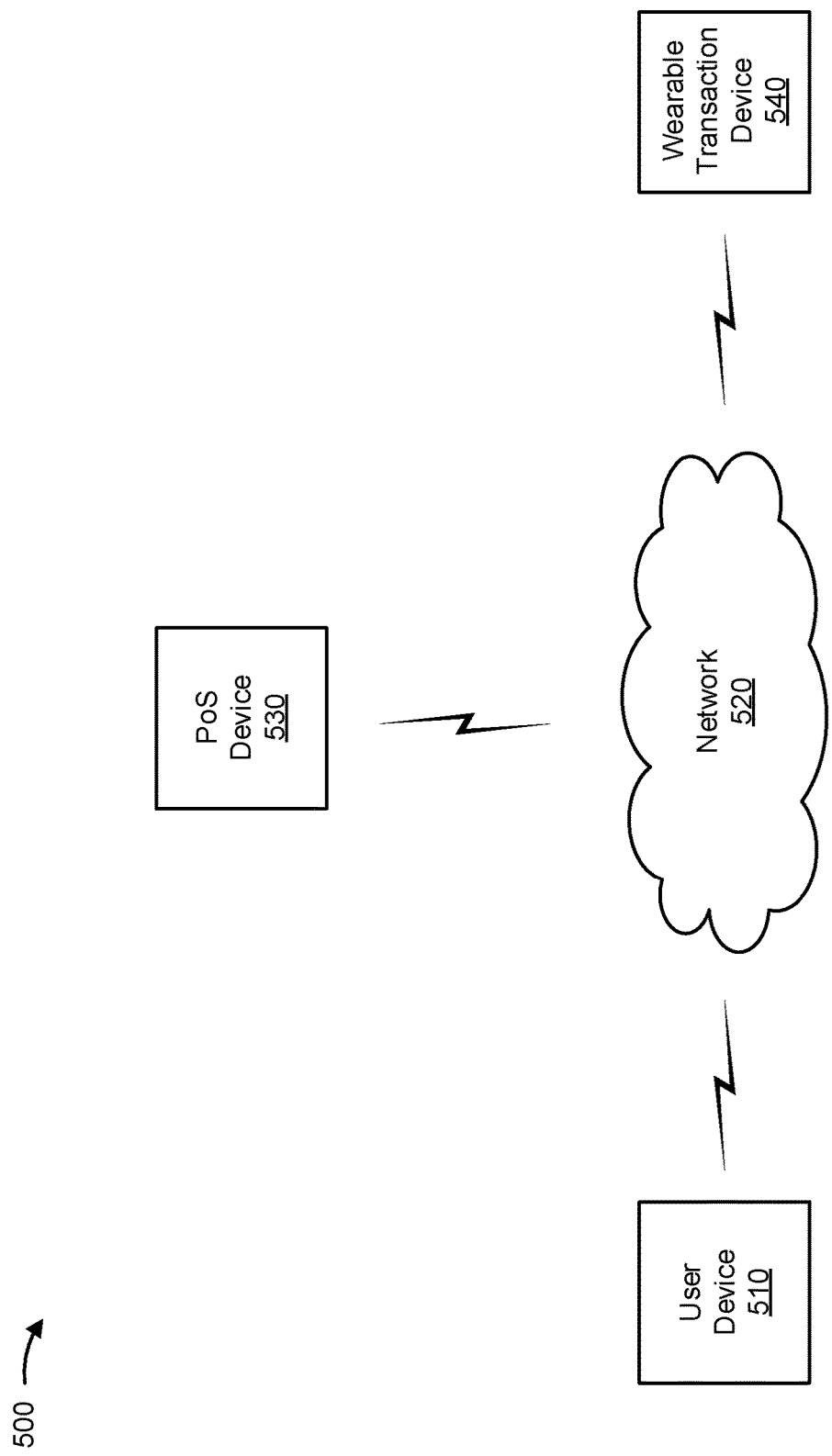
FIG. 5 is a diagram of an example environment in which systems and/or methods described herein may be implemented.

FIG. 5 is a diagram of an example environment 500 in which systems and/or methods, described herein, may be implemented. As shown in FIG. 5, environment 500 may include a user device 510, a network 520, a PoS device 530, and a wearable transaction device 540. Devices of environment 500 may interconnect via wired connections, wireless connections, or a combination of wired and wireless connections.

User device 510 includes one or more devices capable of receiving, generating, storing, processing, and/or providing information, such as information described herein. For example, user device 510 may include a computer (e.g., a desktop computer, a laptop computer, a tablet computer, a handheld computer, a server device, etc.), a mobile phone (e.g., a smart phone, a radiotelephone, etc.), an internet of things (IoT) device or smart appliance, or a similar device. In some implementations, user device 510 may receive information from and/or transmit information to PoS device 530 and/or wearable transaction device 540.

Network 520 includes one or more wired and/or wireless networks. For example, network 520 may include a cellular network (e.g., a fifth generation (5G) network, a long-term evolution (LTE) network, a third generation (3G) network, a code division multiple access (CDMA) network, etc.), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, and/or the like, and/or a combination of these or other types of networks.

PoS device 530 includes a device that conducts and completes a transaction. For example, PoS device 530 may include a POS terminal, such as the PoS terminal 432 shown in FIGS. 4D-4E. PoS device 530 may calculate an amount owed by a customer, may indicate the amount, may prepare an invoice for the customer, and may indicate options for the customer to make a payment. PoS device 530 may be a point at which a customer makes a payment to a merchant in exchange for goods or services. After receiving payment, PoS device 530 may issue a printed or electronic receipt for the transaction.

Wearable transaction device 540 includes a device that is worn by a user (e.g., attached to an ear), carried by the user (e.g., in a pocket), attached to an item of apparel of the user (e.g., a shoe), and/or the like. For example, wearable transaction device 540 may include a wearable transaction device, such as the wearable transaction device 100 shown in FIGS. 1A-1D. In some implementations, wearable transaction device 540 may include a housing, a fastener component (e.g., a clamping arm, a pin backing, a pin, and/or the like) attached to the housing, and an electronic chip within the housing. In some implementations, wearable transaction device 540 may perform transactions based on one or more conditions of security information, as described above.

The number and arrangement of devices and networks shown in FIG. 5 are provided as one or more examples. In practice, there may be additional devices and/or networks, fewer devices and/or networks, different devices and/or networks, or differently arranged devices and/or networks than those shown in FIG. 5. Furthermore, two or more devices shown in FIG. 5 may be implemented within a single device, or a single device shown in FIG. 5 may be implemented as multiple, distributed devices. Additionally, or alternatively, a set of devices (e.g., one or more devices) of environment 500 may perform one or more functions described as being performed by another set of devices of environment 500.

Figure 6:
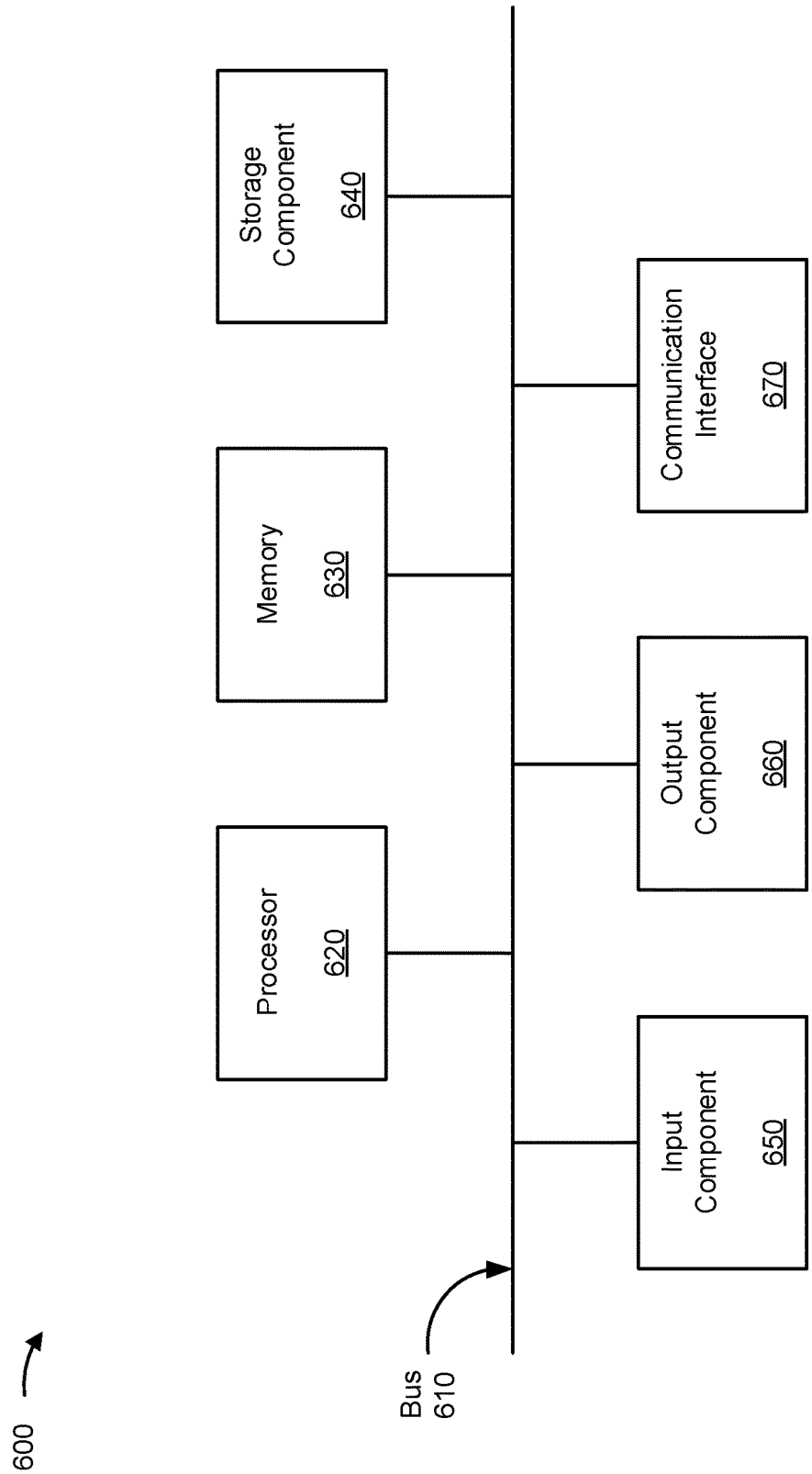
FIG. 6 is a diagram of example components of one or more devices of FIG. 5.

FIG. 6 is a diagram of example components of a device 600. Device 600 may correspond to user device 510, PoS device 530, and/or wearable transaction device 540. In some implementations, user device 510, PoS device 530, and/or wearable transaction device 540 may include one or more devices 600 and/or one or more components of device 600. As shown in FIG. 3, device 600 may include a bus 610, a processor 620, a memory 630, a storage component 640, an input component 650, an output component 660, and a communication interface 670.

Bus 610 includes a component that permits communication among multiple components of device 600. Processor 620 is implemented in hardware, firmware, and/or a combination of hardware and software. Processor 620 is a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some implementations, processor 620 includes one or more processors capable of being programmed to perform a function. In some implementations, processor 620 may correspond to electronic chip 305 in FIG. 3. Memory 630 includes a random access memory (RAM), a read only memory (ROM), and/or another type of dynamic or static storage device (e.g., a flash memory, a magnetic memory, and/or an optical memory) that stores information and/or instructions for use by processor 620.

Storage component 640 stores information and/or software related to the operation and use of device 600. For example, storage component 640 may include a hard disk (e.g., a magnetic disk, an optical disk, and/or a magneto-optic disk), a solid state drive (SSD), a compact disc (CD), a digital versatile disc (DVD), a floppy disk, a cartridge, a magnetic tape, and/or another type of non-transitory computer-readable medium, along with a corresponding drive.

Input component 650 includes a component that permits device 600 to receive information, such as via user input (e.g., a touch screen display, a keyboard, a keypad, a mouse, a button, a switch, and/or a microphone). Additionally, or alternatively, input component 650 may include a component for determining location (e.g., a global positioning system (GPS) component) and/or a sensor (e.g., an accelerometer, a gyroscope, an actuator, another type of positional or environmental sensor, and/or the like). Output component 660 includes a component that provides output information from device 600 (via, e.g., a display, a speaker, a haptic feedback component, an audio or visual indicator, and/or the like).

Communication interface 670 includes a transceiver-like component (e.g., a transceiver, a separate receiver, a separate transmitter, and/or the like) that enables device 600 to communicate with other devices, such as via a wired connection, a wireless connection, or a combination of wired and wireless connections. Communication interface 670 may permit device 600 to receive information from another device and/or provide information to another device. For example, communication interface 670 may include an Ethernet interface, an optical interface, a coaxial interface, an infrared interface, a radio frequency (RF) interface, a universal serial bus (USB) interface, a Wi-Fi interface, a cellular network interface, and/or the like.

Device 600 may perform one or more processes described herein. Device 600 may perform these processes based on processor 620 executing software instructions stored by a non-transitory computer-readable medium, such as memory 630 and/or storage component 640. As used herein, the term "computer-readable medium" refers to a non-transitory memory device. A memory device includes memory space within a single physical storage device or memory space spread across multiple physical storage devices.

Software instructions may be read into memory 630 and/or storage component 640 from another computer-readable medium or from another device via communication interface 670. When executed, software instructions stored in memory 630 and/or storage component 640 may cause processor 620 to perform one or more processes described herein. Additionally, or alternatively, hardware circuitry may be used in place of or in combination with software instructions to perform one or more processes described herein. Thus, implementations described herein are not limited to any specific combination of hardware circuitry and software.

The number and arrangement of components shown in FIG. 6 are provided as an example. In practice, device 600 may include additional components, fewer components, different components, or differently arranged components than those shown in FIG. 6. Additionally, or alternatively, a set of components (e.g., one or more components) of device 600 may perform one or more functions described as being performed by another set of components of device 600.

Figure 7:
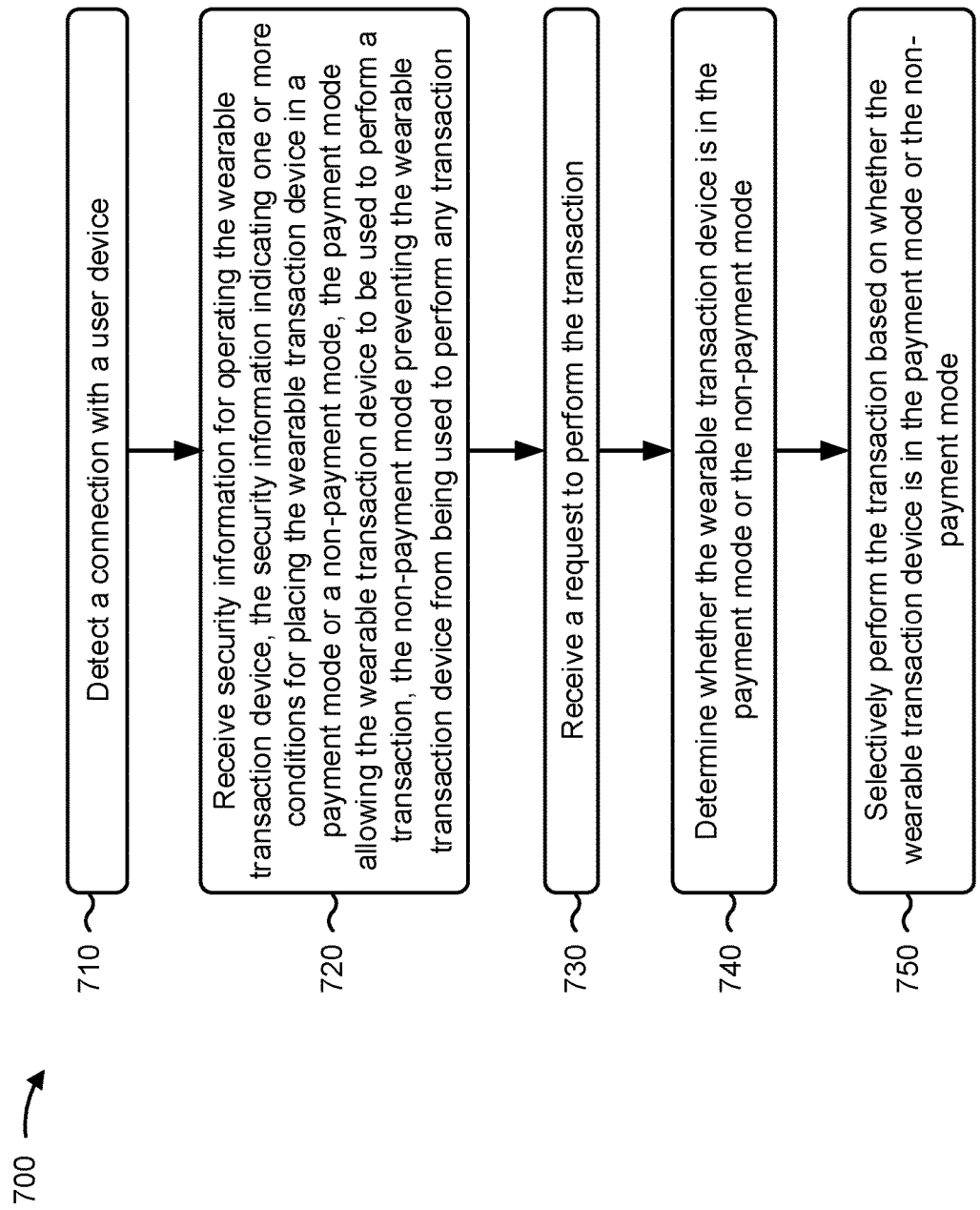
FIG. 7 is a flowchart of an example process for performing a transaction.

FIG. 7 is a flow chart of an example process 700 for performing a transaction. In some implementations, one or more process blocks of FIG. 7 may be performed by a wearable transaction device (e.g., wearable transaction device 100, wearable transaction device 540, and/or the like). In some implementations, one or more process blocks of FIG. 7 may be performed by another device or a group of devices separate from or including the wearable transaction device, such as a user device (e.g., user device 402, user device 510, and/or the like) and/or a PoS device (e.g., PoS terminal 432, PoS device 530, and/or the like), and/or the like.

As shown in FIG. 7, process 700 may include detecting a connection with a user device (block 710). For example, the wearable transaction device (e.g., using electronic chip 305, NFC antenna 310, processor 620, memory 630, storage component 640, input component 650, output component 660, communication interface 670 and/or the like) may detect a connection with a user device, as described above.

As further shown in FIG. 7, process 700 may include receiving, from the user device and via the connection, security information for operating the wearable transaction device, the security information indicating one or more conditions for placing the wearable transaction device in a payment mode or a non-payment mode, the payment mode allowing the wearable transaction device to be used to perform a transaction, and the non-payment mode preventing the wearable transaction device from being used to perform any transaction (block 720). For example, the wearable transaction device (e.g., using electronic chip 305, NFC antenna 310, processor 620, memory 630, storage component 640, input component 650, output component 660, communication interface 670 and/or the like) may receive, from the user device and via the connection, security information for operating the wearable transaction device, as described above. In some implementations, the security information may indicate one or more conditions for placing the wearable transaction device in a payment mode or a non-payment mode. In some implementations, the payment mode may allow the wearable transaction device to be used to perform a transaction and the non-payment mode preventing the wearable transaction device from being used to perform any transaction.

As further shown in FIG. 7, process 700 may include receiving a request to perform the transaction (block 730). For example, the wearable transaction device (e.g., using electronic chip 305, NFC antenna 310, processor 620, memory 630, storage component 640, input component 650, output component 660, communication interface 670 and/or the like) may receive a request to perform the transaction, as described above.

As further shown in FIG. 7, process 700 may include determining, based on the security information, whether the wearable transaction device is in the payment mode or the non-payment mode (block 740). For example, the wearable transaction device (e.g., using electronic chip 305, NFC antenna 310, processor 620, memory 630, storage component 640, input component 650, output component 660, communication interface 670 and/or the like) may determine, based on the security information, whether the wearable transaction device is in the payment mode or the non-payment mode, as described above.

As further shown in FIG. 7, process 700 may include selectively performing the transaction based on whether the wearable transaction device is in the payment mode or the non-payment mode (block 750). For example, the wearable transaction device (e.g., using electronic chip 305, NFC antenna 310, processor 620, memory 630, storage component 640, input component 650, output component 660, communication interface 670 and/or the like) may selectively perform the transaction based on whether the wearable transaction device is in the payment mode or the non-payment mode, as described above.

Process 700 may include additional implementations, such as any single implementation or any combination of implementations described below and/or in connection with one or more other processes described elsewhere herein.

In a first implementation, the wearable transaction device may comprise a housing having a front surface, a rear surface, and a side surface, where the front surface may be monolithic with the side surface; a fastener component attached to the rear surface of the housing, where the fastener component may be movable being an open position and a closed position to facilitate attaching the wearable transaction device to a user or apparel of the user; and an electronic chip enclosed within an interior of the housing, where the electronic chip may be configured to perform one or more of the blocks of process 700.

In a second implementation, alone or in combination with the first implementation, the front surface, the rear surface, and the side surface may each have an area of less than 40 $cm^2$.

In a third implementation, alone or in combination with one or more of the first and second implementations, the fastener component may comprise one of: a clamping arm pivotably attached to the rear surface of the housing, a pin backing slidably attached to a pin that projects from the rear surface of the housing, or a pin pivotably attached to the rear surface of the housing.

In a fourth implementation, alone or in combination with one or more of the first through third implementations, the electronic chip may be an integrated circuit chip. In some implementations, the wearable transaction device may further comprise an antenna enclosed within the interior of the housing to supply power to the electronic chip when the wearable transaction device is within an electromagnetic field, and a battery enclosed within the interior of the housing to assist the antenna in supplying power to the electronic chip.

In a fifth implementation, alone or in combination with one or more of the first through fourth implementations, the one or more conditions may indicate a threshold number of transactions that can be made while the wearable transaction device is in the payment mode. In some implementations, process 700, when determining whether the wearable transaction device is in the payment mode or the non-payment mode, may include detecting whether the threshold number has been satisfied to place the wearable transaction device in the non-payment mode.

In a sixth implementation, alone or in combination with one or more of the first through fifth implementations, the one or more conditions may be associated with whether the fastener component is in the open position or the closed position. In some implementations, process 700, when determining whether the wearable transaction device is in the payment mode or the non-payment mode, may include detecting whether the fastener component is in the open position or the closed position to place the wearable transaction device in the non-payment mode.

In a seventh implementation, alone or in combination with one or more of the first through sixth implementations, the one or more conditions may indicate a threshold number of times the fastener component can be in the open position or the closed position while the wearable transaction device is in the payment mode. In some implementations, process 700, when determining whether the wearable transaction device is in the payment mode or the non-payment mode, may include detecting whether the threshold number has been satisfied to place the wearable transaction device in the non-payment mode.

In an eighth implementation, alone or in combination with one or more of the first through seventh implementations, the wearable transaction device may comprise a housing having a front surface, a rear surface, and a side surface, where the front surface, the rear surface, and the side surface each may have an area less than 40 cm$^2$; a fastener component projecting from the housing, where the fastener component may be adapted to attach the wearable transaction device to a user or apparel of the user; and an electronic chip secured within the housing, where the electronic chip may be configured to perform one or more of the blocks of process 700.

In a ninth implementation, alone or in combination with one or more of the first through eighth implementations, the one or more conditions may indicate a threshold amount of time that the wearable transaction device can remain in the payment mode. In some implementations, process 700, when determining whether the wearable transaction device is in the payment mode or the non-payment mode, may include detecting whether the threshold amount of time has been satisfied to place the wearable transaction device in the non-payment mode.

In a tenth implementation, alone or in combination with one or more of the first through ninth implementations, the one or more conditions may indicate a threshold amount of money that can be transferred while the wearable transaction device is in the payment mode. In some implementations, process 700, when determining whether the wearable transaction device is in the payment mode or the non-payment mode, may include detecting whether the threshold amount of money has been satisfied to place the wearable transaction device in the non-payment mode.

In an eleventh implementation, alone or in combination with one or more of the first through tenth implementations, the security information may include one or more virtual credit card numbers to be used for transactions associated with the wearable transaction device.

In a twelfth implementation, alone or in combination with one or more of the first through eleventh implementations, the one or more conditions may indicate a threshold amount of time the wearable transaction device can remain stationary while the wearable transaction device is in the payment mode. In some implementations, process 700, when determining whether the wearable transaction device is in the payment mode or the non-payment mode, may include detecting whether the threshold amount of time has been satisfied to place the wearable transaction device in the non-payment mode.

In a thirteenth implementation, alone or in combination with one or more of the first through twelfth implementations, the fastener component may be a clamp arm pivotably movable between an open position and a closed position. In some implementations, the one or more conditions may indicate a threshold number of times the clamp arm can be in the open position or the closed position while the wearable transaction device is in the payment mode. In some implementations, process 700, when determining whether the wearable transaction device is in the payment mode or the non-payment mode, may include detecting whether the threshold number has been satisfied to place the wearable transaction device in the non-payment mode.

In a fourteenth implementation, alone or in combination with one or more of the first through thirteenth implementations, the wearable transaction device may comprise a button movably attached to the housing, where the button may selectively permit power to be provided to the electronic chip.

Although FIG. 7 shows example blocks of process 700, in some implementations, process 700 may include additional blocks, fewer blocks, different blocks, or differently arranged blocks than those depicted in FIG. 7. Additionally, or alternatively, two or more of the blocks of process 700 may be performed in parallel.

Figure 8:
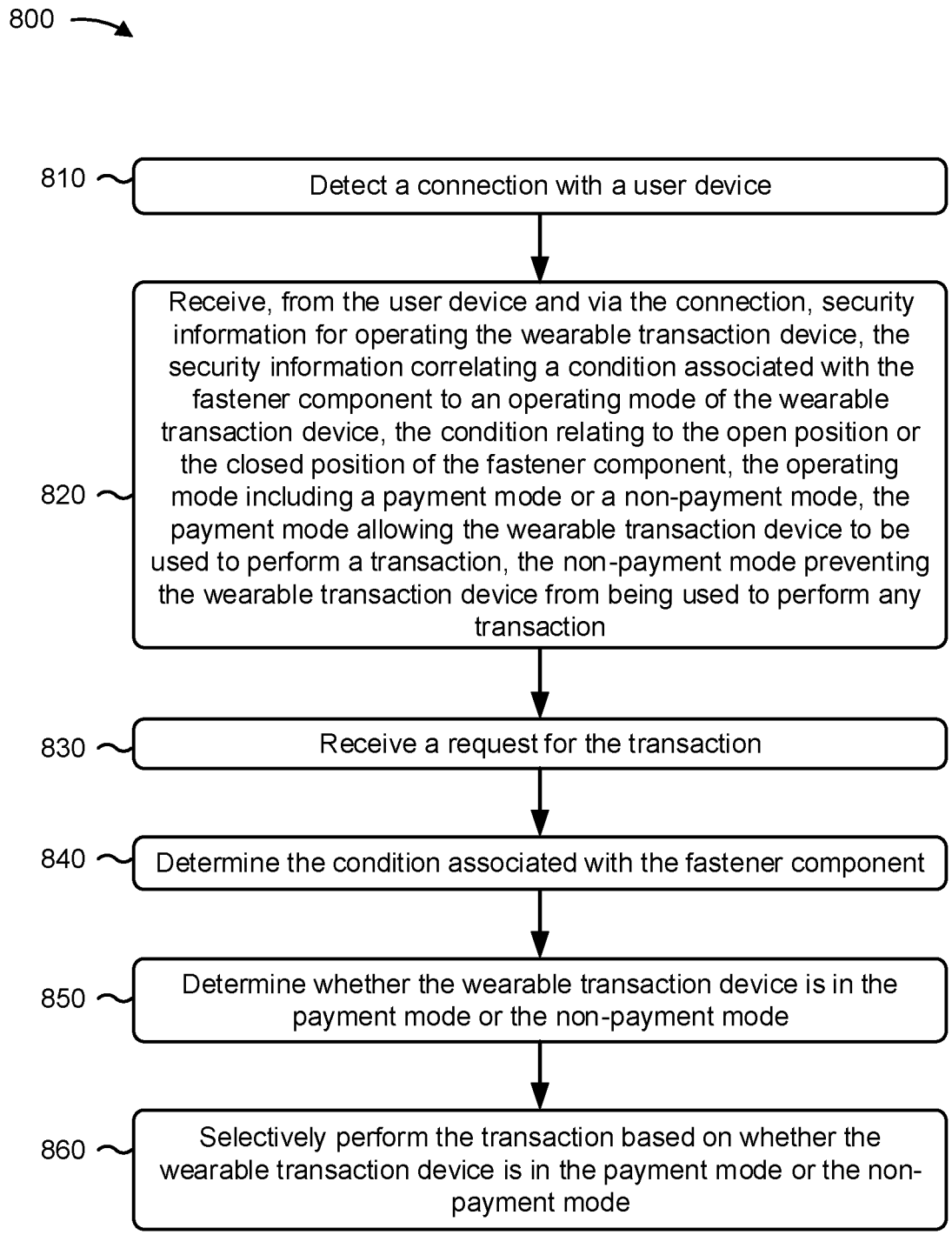
FIG. 8 is a flowchart of an example process for performing a transaction.

FIG. 8 is a flow chart of an example process 800 for performing a transaction. In some implementations, one or more process blocks of FIG. 8 may be performed by wearable transaction device (e.g., wearable transaction device 100, wearable transaction device 540, and/or the like). In some implementations, one or more process blocks of FIG. 8 may be performed by another device or a group of devices separate from or including the wearable transaction device, such as a user device (e.g., user device 402, user device 510, and/or the like), a PoS device (e.g., PoS terminal 432, PoS device 530, and/or the like), and/or the like. In some implementations, the wearable transaction device 540 may include a fastener component that is movable between an open position and a closed position.

As shown in FIG. 8, process 800 may include detecting a connection with a user device (block 810). For example, the wearable transaction device (e.g., using electronic chip 305, NFC antenna 310, processor 620, memory 630, storage component 640, input component 650, output component 660, communication interface 670 and/or the like) may detect a connection with a user device, as described above.

As further shown in FIG. 8, process 800 may include receiving, from the user device and via the connection, security information for operating the wearable transaction device, the security information correlating a condition associated with the fastener component to an operating mode of the wearable transaction device, the condition relating to the open position or the closed position of the fastener component, the operating mode including a payment mode or a non-payment mode, the payment mode allowing the wearable transaction device to be used to perform a transaction and the non-payment mode preventing the wearable transaction device from being used to perform any transaction (block 820). For example, the wearable transaction device (e.g., using electronic chip 305, NFC antenna 310, processor 620, memory 630, storage component 640, input component 650, output component 660, communication interface 670 and/or the like) may receive, from the user device and via the connection, security information for operating the wearable transaction device, as described above. In some implementations, the security information may correlate a condition associated with the fastener component to an operating mode of the wearable transaction device. In some implementations, the condition may relate to the open position or the closed position of the fastener component. In some implementations, the operating mode may include a payment mode or a non-payment mode, where the payment mode may allow the wearable transaction device to be used to perform a transaction and the non-payment mode may prevent the wearable transaction device from being used to perform any transaction.

As further shown in FIG. 8, process 800 may include receiving a request for the transaction (block 830). For example, the wearable transaction device (e.g., using electronic chip 305, NFC antenna 310, processor 620, memory 630, storage component 640, input component 650, output component 660, communication interface 670 and/or the like) may receive a request for the transaction, as described above.

As further shown in FIG. 8, process 800 may include determining the condition associated with the fastener component (block 840). For example, the wearable transaction device (e.g., using electronic chip 305, NFC antenna 310, processor 620, memory 630, storage component 640, input component 650, output component 660, communication interface 670 and/or the like) may determine the condition associated with the fastener component, as described above.

As further shown in FIG. 8, process 800 may include determining, based on the condition associated with the fastener component and the security information, whether the wearable transaction device is in the payment mode or the non-payment mode (block 850). For example, the wearable transaction device (e.g., using electronic chip 305, NFC antenna 310, processor 620, memory 630, storage component 640, input component 650, output component 660, communication interface 670 and/or the like) may determine, based on the condition associated with the fastener component and the security information, whether the wearable transaction device is in the payment mode or the non-payment mode, as described above.

As further shown in FIG. 8, process 800 may include selectively perform the transaction based on whether the wearable transaction device is in the payment mode or the non-payment mode (block 860). For example, the wearable transaction device (e.g., using electronic chip 305, NFC antenna 310, processor 620, memory 630, storage component 640, input component 650, output component 660, communication interface 670 and/or the like) may selectively perform the transaction based on whether the wearable transaction device is in the payment mode or the non-payment mode, as described above.

Process 800 may include additional implementations, such as any single implementation or any combination of implementations described below and/or in connection with one or more other processes described elsewhere herein.

In a first implementation, the wearable transaction device may comprise a housing defining an interior; a fastener component attached to the housing, where the fastener component may be movable between an open position and a closed position to facilitate attaching the wearable transaction device to a user or apparel of the user; and an electronic chip enclosed within the interior of the housing, where the electronic chip may be configured to perform one or more blocks of process 800.

In a second implementation, alone or in combination with the first implementation, the fastener component may include a clamping arm pivotably movable between the open position and the closed position. In some implementations, the housing and the fastener component together may define a clip, where the clip may be adapted to retain a body part of the user or a portion of the apparel of the user between the clamping arm and the housing.

In a third implementation, alone or in combination with one or more of the first and second implementations, the fastener component may comprise one of a clamping arm pivotably attached to the housing, a pin backing slidably attached to a pin that projects from the housing, or a pin pivotably attached to the housing.

In a fourth implementation, alone or in combination with one or more of the first through third implementations, the open position of the fastener component may correspond to the payment mode, and the closed position of the fastener component may correspond to the non-payment mode.

In a fifth implementation, alone or in combination with one or more of the first through fourth implementations, the condition may indicate a threshold number of times the fastener component can be in the open position or the closed position while the wearable transaction device is in the payment mode. In some implementations, process 800, when determining whether the wearable transaction device is in the payment mode or the non-payment mode, may include detecting whether the threshold number has been satisfied to place the wearable transaction device in the non-payment mode.

In a sixth implementation, alone or in combination with one or more of the first through fifth implementations, the security information may indicate one or more of a threshold number of transactions that can be made while the wearable transaction device is in the payment mode, a threshold amount of time that the wearable transaction device can remain in the payment mode, a threshold amount of money that can be transferred while the wearable transaction device is in the payment mode, or a threshold amount of time that the wearable transaction device can remain stationary while the wearable transaction device is in the payment mode.

Although FIG. 8 shows example blocks of process 800, in some implementations, process 800 may include additional blocks, fewer blocks, different blocks, or differently arranged blocks than those depicted in FIG. 8. Additionally, or alternatively, two or more of the blocks of process 800 may be performed in parallel.

The foregoing disclosure provides illustration and description, but is not intended to be exhaustive or to limit the implementations to the precise form disclosed. Modifications and variations may be made in light of the above disclosure or may be acquired from practice of the implementations.

As used herein, the term "component" is intended to be broadly construed as hardware, firmware, or a combination of hardware and software.

Some implementations are described herein in connection with thresholds. As used herein, satisfying a threshold may, depending on the context, refer to a value being greater than the threshold, more than the threshold, higher than the threshold, greater than or equal to the threshold, less than the threshold, fewer than the threshold, lower than the threshold, less than or equal to the threshold, equal to the threshold, or the like.

Certain user interfaces have been described herein and/or shown in the figures. A user interface may include a graphical user interface, a non-graphical user interface, a text-based user interface, and/or the like. A user interface may provide information for display. In some implementations, a user may interact with the information, such as by providing input via an input component of a device that provides the user interface for display. In some implementations, a user interface may be configurable by a device and/or a user (e.g., a user may change the size of the user interface, information provided via the user interface, a position of information provided via the user interface, etc.). Additionally, or alternatively, a user interface may be pre-configured to a standard configuration, a specific configuration based on a type of device on which the user interface is displayed, and/or a set of configurations based on capabilities and/or specifications associated with a device on which the user interface is displayed.

It will be apparent that systems and/or methods described herein may be implemented in different forms of hardware, firmware, or a combination of hardware and software. The actual specialized control hardware or software code used to implement these systems and/or methods is not limiting of the implementations. Thus, the operation and behavior of the systems and/or methods are described herein without reference to specific software code—it being understood that software and hardware can be designed to implement the systems and/or methods based on the description herein.

Even though particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, a combination of related and unrelated items, etc.), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A wearable transaction device, comprising:
   a housing having a front surface, a rear surface, and a side surface,
   the front surface being monolithic with the side surface;
   a fastener component attached to the rear surface of the housing,
      the fastener component being movable between an open position and a closed position to facilitate attaching the wearable transaction device to a user or apparel of the user; and
   an electronic chip enclosed within an interior of the housing,
      the electronic chip configured to:
         detect a connection with a user device;
         receive, from the user device and via the connection, security information for operating the wearable transaction device,
            the security information indicating conditions for placing the wearable transaction device in a payment mode or a non-payment mode,
            the payment mode allowing the wearable transaction device to be used to perform a transaction independent of the user device,
            the non-payment mode preventing the wearable transaction device from being used to perform any transaction until the wearable transaction device is re-paired with the user device,
            the conditions including two or more of:
               a first condition associated with the fastener component,
               a second condition relating to a threshold amount of money that can be transferred while the wearable transaction device is in the payment mode,
               a third condition relating to a threshold period of time since the wearable transaction device was last paired with the user device, or
               a fourth condition relating to a threshold number of transactions that can be made while the wearable transaction device is in the payment mode;
         terminate, based on receiving the security information, the connection with the user device;
         receive a request to perform the transaction;
         determine, based on the security information, whether the wearable transaction device is in the payment mode or the non-payment mode; and
         selectively perform the transaction based on whether the wearable transaction device is in the payment mode or the non-payment mode.

2. The wearable transaction device of claim 1, wherein the conditions include the fourth condition; and
   wherein the electronic chip, when determining whether the wearable transaction device is in the payment mode or the non-payment mode, is configured to detect whether the threshold number has been satisfied to place the wearable transaction device in the non-payment mode.

3. The wearable transaction device of claim 1, wherein the conditions include the first condition, and wherein the first condition is associated with whether the fastener component is in the open position or the closed position; and
wherein the electronic chip, when determining whether the wearable transaction device is in the payment mode or the non-payment mode, is configured to detect whether the fastener component is in the open position or the closed position to place the wearable transaction device in the non-payment mode.

4. The wearable transaction device of claim 1, wherein the conditions include the first condition, and wherein the first condition indicates a threshold number of times the fastener component can be in the open position or the closed position while the wearable transaction device is in the payment mode; and
wherein the electronic chip, when determining whether the wearable transaction device is in the payment mode or the non-payment mode, is configured to detect whether the threshold number has been satisfied to place the wearable transaction device in the non-payment mode.

5. The wearable transaction device of claim 1, wherein the front surface, the rear surface, and the side surface each has an area of less than 40 cm².

6. The wearable transaction device of claim 1, wherein the fastener component comprises one of:
a clamping arm pivotably attached to the rear surface of the housing,
a pin backing slidably attached to a pin that projects from the rear surface of the housing, or
a pin pivotably attached to the rear surface of the housing.

7. The wearable transaction device of claim 1, wherein the electronic chip is an integrated circuit chip; and
wherein the wearable transaction device further comprises:
an antenna enclosed within the interior of the housing to supply power to the electronic chip when the wearable transaction device is within an electromagnetic field; and
a battery enclosed within the interior of the housing to assist the antenna in supplying power to the electronic chip.

8. A wearable transaction device, comprising:
a housing defining an interior;
a fastener component attached to the housing,
the fastener component being movable between an open position and a closed position to facilitate attaching the wearable transaction device to a user or apparel of the user; and
an electronic chip enclosed within the interior of the housing,
the electronic chip configured to:
detect a connection with a user device;
receive, from the user device and via the connection, security information for operating the wearable transaction device,
the security information indicating conditions for placing the wearable transaction device in a payment mode or a non-payment mode,
the payment mode allowing the wearable transaction device to be used to perform a transaction independent of the user device,
the non-payment mode preventing the wearable transaction device from being used to perform any transaction until the wearable transaction device is re-paired with the user device,
the conditions including two or more of:
a first condition that relates to the open position or the closed position of the fastener component,
a second condition relating to a threshold amount of money that can be transferred while the wearable transaction device is in the payment mode,
a third condition relating to a threshold period of time since the wearable transaction device was last paired with the user device, or
a fourth condition relating to a threshold number of transactions that can be made while the wearable transaction device is in the payment mode;
terminate, based on receiving the security information, the connection with the user device;
receive a request for the transaction;
determine, based on the security information, whether the wearable transaction device is in the payment mode or the non-payment mode; and
selectively perform the transaction based on whether the wearable transaction device is in the payment mode or the non-payment mode.

9. The wearable transaction device of claim 8, wherein the conditions include the first condition,
wherein the open position of the fastener component corresponds to the payment mode; and
wherein the closed position of the fastener component corresponds to the non-payment mode.

10. The wearable transaction device of claim 8, wherein the conditions include the first condition and the first condition indicates a threshold number of times the fastener component can be in the open position or the closed position while the wearable transaction device is in the payment mode; and
wherein the electronic chip, when determining whether the wearable transaction device is in the payment mode or the non-payment mode, is configured to detect whether the threshold number has been satisfied to place the wearable transaction device in the non-payment mode.

11. The wearable transaction device of claim 8, wherein the fastener component includes a clamping arm pivotably movable between the open position and the closed position; and
wherein the housing and the fastener component together define a clip,
the clip being adapted to retain a body part of the user or a portion of the apparel of the user between the clamping arm and the housing.

12. The wearable transaction device of claim 8, wherein the fastener component comprises one of:
a clamping arm pivotably attached to the housing,
a pin backing slidably attached to a pin that projects from the housing, or
a pin pivotably attached to the housing.

13. The wearable transaction device of claim 8, wherein the security information additionally indicates one or more of:
a threshold amount of time that the wearable transaction device can remain in the payment mode; or a threshold amount of time that the wearable transaction device can remain stationary while the wearable transaction device is in the payment mode.

14. A wearable transaction device, comprising:
a housing having a front surface, a rear surface, and a side surface,
the front surface, the rear surface, and the side surface each having an area less than 40 centimeters square ($cm^2$);
a fastener component projecting from the housing,
the fastener component being adapted to attach the wearable transaction device to a user or apparel of the user; and
an electronic chip secured within the housing,
the electronic chip configured to:
detect a connection with a user device;
receive, from the user device and via the connection, security information for operating the wearable transaction device,
the security information indicating conditions for placing the wearable transaction device in a payment mode or a non-payment mode,
the payment mode allowing the wearable transaction device to be used to perform a transaction independent of the user device,
the non-payment mode preventing the wearable transaction device from being used to perform any transaction until the wearable transaction device is re-paired with the user device,
the conditions including two or more of:
a first condition associated with the fastener component,
a second condition relating to a threshold amount of money that can be transferred while the wearable transaction device is in the payment mode,
a third condition relating to a threshold period of time since the wearable transaction device was last paired with the user device, or
a fourth condition relating to a threshold number of transactions that can be made while the wearable transaction device is in the payment mode;
terminate, based on receiving the security information, the connection with the user device;
receive a request to perform the transaction;
determine, based on the security information, whether the wearable transaction device is in the payment mode or the non-payment mode; and
selectively perform the transaction based on whether the wearable transaction device is in the payment mode or the non-payment mode.

15. The wearable transaction device of claim 14, wherein the conditions additionally include a fifth condition that indicates a threshold amount of time that the wearable transaction device can remain in the payment mode; and
wherein the electronic chip, when determining whether the wearable transaction device is in the payment mode or the non-payment mode, is configured to detect whether the threshold amount of time has been satisfied to place the wearable transaction device in the non-payment mode.

16. The wearable transaction device of claim 14, wherein the conditions include the second condition; and
wherein the electronic chip, when determining whether the wearable transaction device is in the payment mode or the non-payment mode, is configured to detect whether the threshold amount of money has been satisfied to place the wearable transaction device in the non-payment mode.

17. The wearable transaction device of claim 14, wherein the security information further includes one or more virtual credit card numbers to be used for transactions associated with the wearable transaction device.

18. The wearable transaction device of claim 14, wherein the conditions additionally include a sixth condition that indicates a threshold amount of time the wearable transaction device can remain stationary while the wearable transaction device is in the payment mode; and
wherein the electronic chip, when determining whether the wearable transaction device is in the payment mode or the non-payment mode, is configured to detect whether the threshold amount of time has been satisfied to place the wearable transaction device in the non-payment mode.

19. The wearable transaction device of claim 14, wherein the fastener component is a clamp arm pivotably movable between an open position and a closed position;
wherein the conditions include the first condition, and wherein the first condition indicates a threshold number of times the clamp arm can be in the open position or the closed position while the wearable transaction device is in the payment mode; and
wherein the electronic chip, when determining whether the wearable transaction device is in the payment mode or the non-payment mode, is configured to detect whether the threshold number has been satisfied to place the wearable transaction device in the non-payment mode.

20. The wearable transaction device of claim 14, further comprising a button movably attached to the housing,
the button selectively permitting power to be provided to the electronic chip.

* * * * *